(12) United States Patent
Taylor et al.

(10) Patent No.: US 7,638,104 B2
(45) Date of Patent: Dec. 29, 2009

(54) AIR CONDITIONER DEVICE INCLUDING PIN-RING ELECTRODE CONFIGURATIONS WITH DRIVER ELECTRODE

(75) Inventors: Charles E. Taylor, Punta Gorda, FL (US); Andrew J. Parker, Novato, CA (US); Igor Y. Botvinnik, Novato, CA (US); Shek Fai Lau, Foster City, CA (US); Gregory S. Snyder, San Francisco, CA (US); John Paul Reeves, Hong Kong (CN)

(73) Assignee: Sharper Image Acquisition LLC, New York, NY (US)

( * ) Notice: Subject to any disclaimer, the term of this patent is extended or adjusted under 35 U.S.C. 154(b) by 789 days.

(21) Appl. No.: 11/003,752

(22) Filed: Dec. 3, 2004

(65) Prior Publication Data

US 2005/0194583 A1 Sep. 8, 2005

Related U.S. Application Data

(63) Continuation-in-part of application No. 10/791,561, filed on Mar. 2, 2004, now Pat. No. 7,517,503.

(60) Provisional application No. 60/591,031, filed on Jul. 26, 2004.

(51) Int. Cl.
*B01J 19/08* (2006.01)
(52) U.S. Cl. ............... 422/186.04; 422/121; 96/96
(58) Field of Classification Search ............ 422/186.04, 422/121; 96/96
See application file for complete search history.

(56) References Cited

U.S. PATENT DOCUMENTS 653,421 A 7/1900 Lorey 895,729 A 8/1908 Carlborg (Continued)

FOREIGN PATENT DOCUMENTS

CN 2111112 U 7/1972

(Continued)

OTHER PUBLICATIONS

U.S. Appl. No. 60/104,573, filed Oct. 16, 1998, Krichtafovitch.

(Continued)

*Primary Examiner*—Kishor Mayeakr
(74) *Attorney, Agent, or Firm*—Arent Fox LLP; Marylee Jenkins

(57) ABSTRACT

Embodiments of the present invention are related to air conditioner systems and methods. In accordance with one embodiment of the present invention, a system includes at least one emitter electrode and at least one collector electrode that is downstream from the emitter electrode. The emitter electrode has a plurality of pins axially arranged about a center. Preferably, the pins are arranged in a circle about the center. A driver electrode is located within the interior of the collector electrode. Preferably, although not necessarily, the driver electrode is insulated. A high voltage source provides a voltage potential to at least one of the emitter electrode and the collector electrode to thereby provide a potential difference therebetween. The embodiments as described herein have some or all of the advantages of increasing the particle collection efficiency, increasing the rate and/or volume of airflow, reducing arcing, and/or reducing the amount of ozone generated.

41 Claims, 17 Drawing Sheets

U.S. PATENT DOCUMENTS

| | | |
|---|---|---|
| 995,958 A | 6/1911 | Goldberg |
| 1,791,338 A | 2/1931 | Wintermute |
| 1,869,335 A | 7/1932 | Day |
| 1,882,949 A | 10/1932 | Ruder |
| 2,129,783 A | 9/1938 | Penney |
| 2,327,588 A | 8/1943 | Bennett |
| 2,359,057 A | 9/1944 | Skinner |
| 2,509,548 A | 5/1950 | White |
| 2,590,447 A | 3/1952 | Nord et al. |
| 2,949,550 A | 8/1960 | Brown |
| 3,018,394 A | 1/1962 | Brown |
| 3,026,964 A | 3/1962 | Penney |
| 3,374,941 A | 3/1968 | Okress |
| 3,518,462 A | 6/1970 | Brown |
| 3,540,191 A | 11/1970 | Herman |
| 3,581,470 A | 6/1971 | Aitkenhead et al. |
| 3,638,058 A | 1/1972 | Fritzius |
| 3,744,216 A | 7/1973 | Halloran |
| 3,806,763 A | 4/1974 | Masuda |
| 3,892,927 A | 7/1975 | Lindenberg |
| 3,945,813 A | 3/1976 | Iinoya et al. |
| 3,958,960 A | 5/1976 | Bakke |
| 3,958,961 A | 5/1976 | Bakke |
| 3,958,962 A | 5/1976 | Hayashi |
| 3,981,695 A | 9/1976 | Fuchs |
| 3,984,215 A | 10/1976 | Zucker |
| 3,988,131 A | 10/1976 | Kanazawa et al. |
| 4,007,024 A | 2/1977 | Sallee et al. |
| 4,052,177 A | 10/1977 | Kide |
| 4,056,372 A | 11/1977 | Hayashi |
| 4,070,163 A | 1/1978 | Kolb et al. |
| 4,074,983 A | 2/1978 | Bakke |
| 4,092,134 A | 5/1978 | Kikuchi |
| 4,097,252 A | 6/1978 | Kirchhoff et al. |
| 4,102,654 A | 7/1978 | Pellin |
| 4,104,042 A | 8/1978 | Brozenick |
| 4,110,086 A | 8/1978 | Schwab et al. |
| 4,119,415 A | 10/1978 | Hayashi et al. |
| 4,126,434 A | 11/1978 | Keiichi |
| 4,138,233 A | 2/1979 | Masuda |
| 4,147,522 A | 4/1979 | Gonas et al. |
| 4,155,792 A | 5/1979 | Gelhaar et al. |
| 4,171,975 A | 10/1979 | Kato et al. |
| 4,185,971 A | 1/1980 | Isahaya |
| 4,189,308 A | 2/1980 | Feldman |
| 4,205,969 A | 6/1980 | Matsumoto |
| 4,209,306 A | 6/1980 | Feldman et al. |
| 4,218,225 A | 8/1980 | Kirchhoff et al. |
| 4,225,323 A | 9/1980 | Zarchy et al. |
| 4,227,894 A | 10/1980 | Proynoff |
| 4,231,766 A | 11/1980 | Spurgin |
| 4,232,355 A | 11/1980 | Finger et al. |
| 4,244,710 A | 1/1981 | Burger |
| 4,244,712 A | 1/1981 | Tongret |
| 4,251,234 A | 2/1981 | Chang |
| 4,253,852 A | 3/1981 | Adams |
| 4,259,093 A | 3/1981 | Vlastos et al. |
| 4,259,452 A | 3/1981 | Yukuta et al. |
| 4,259,707 A | 3/1981 | Penney |
| 4,264,343 A | 4/1981 | Natarajan et al. |
| 4,266,948 A | 5/1981 | Teague et al. |
| 4,282,014 A | 8/1981 | Winkler et al. |
| 4,284,420 A | 8/1981 | Borysiak |
| 4,289,504 A | 9/1981 | Scholes |
| 4,293,319 A | 10/1981 | Claassen, Jr. |
| 4,308,036 A | 12/1981 | Zahedi et al. |
| 4,315,188 A | 2/1982 | Cerny et al. |
| 4,318,718 A | 3/1982 | Utsumi et al. |
| 4,338,560 A | 7/1982 | Lemley |
| 4,342,571 A | 8/1982 | Hayashi |
| 4,349,359 A | 9/1982 | Fitch et al. |
| 4,351,648 A | 9/1982 | Penney |
| 4,354,861 A | 10/1982 | Kalt |
| 4,357,150 A | 11/1982 | Masuda et al. |
| 4,362,632 A | 12/1982 | Jacob |
| 4,363,072 A | 12/1982 | Coggins |
| 4,366,525 A | 12/1982 | Baumgartner |
| 4,369,776 A | 1/1983 | Roberts |
| 4,375,364 A | 3/1983 | Van Hoesen et al. |
| 4,380,900 A | 4/1983 | Linder et al. |
| 4,386,395 A | 5/1983 | Francis, Jr. |
| 4,391,614 A | 7/1983 | Rozmus |
| 4,394,239 A | 7/1983 | Kitzelmann et al. |
| 4,405,342 A | 9/1983 | Bergman |
| 4,406,671 A | 9/1983 | Rozmus |
| 4,412,850 A | 11/1983 | Kurata et al. |
| 4,413,225 A | 11/1983 | Donig et al. |
| 4,414,603 A | 11/1983 | Masuda |
| 4,435,190 A | 3/1984 | Taillet et al. |
| 4,440,552 A | 4/1984 | Uchiya et al. |
| 4,443,234 A | 4/1984 | Carlsson |
| 4,445,911 A | 5/1984 | Lind |
| 4,477,263 A | 10/1984 | Shaver et al. |
| 4,477,268 A | 10/1984 | Kalt |
| 4,481,017 A | 11/1984 | Furlong |
| 4,496,375 A | 1/1985 | Levantine |
| 4,502,002 A | 2/1985 | Ando |
| 4,505,724 A | 3/1985 | Baab |
| 4,509,958 A | 4/1985 | Masuda et al. |
| 4,514,780 A | 4/1985 | Brussee et al. |
| 4,515,982 A | 5/1985 | Lechtken et al. |
| 4,516,991 A | 5/1985 | Kawashima |
| 4,521,229 A | 6/1985 | Baker et al. |
| 4,522,634 A | 6/1985 | Frank |
| 4,534,776 A | 8/1985 | Mammel et al. |
| 4,536,698 A | 8/1985 | Shevalenko et al. |
| 4,544,382 A | 10/1985 | Taillet et al. |
| 4,555,252 A | 11/1985 | Eckstein |
| 4,569,684 A | 2/1986 | Ibbott |
| 4,582,961 A | 4/1986 | Frederiksen |
| 4,587,475 A | 5/1986 | Finney, Jr. et al. |
| 4,588,423 A | 5/1986 | Gillingham et al. |
| 4,590,042 A | 5/1986 | Drage |
| 4,597,780 A | 7/1986 | Reif |
| 4,597,781 A | 7/1986 | Spector |
| 4,600,411 A | 7/1986 | Santamaria |
| 4,601,733 A | 7/1986 | Ordines et al. |
| 4,604,174 A | 8/1986 | Bollinger et al. |
| 4,614,573 A | 9/1986 | Masuda |
| 4,623,365 A | 11/1986 | Bergman |
| 4,626,261 A | 12/1986 | Jorgensen |
| 4,632,135 A | 12/1986 | Lenting et al. |
| 4,632,746 A | 12/1986 | Bergman |
| 4,636,981 A | 1/1987 | Ogura |
| 4,643,744 A | 2/1987 | Brooks |
| 4,643,745 A * | 2/1987 | Sakakibara et al. ............ 96/76 |
| 4,647,836 A | 3/1987 | Olsen |
| 4,650,648 A | 3/1987 | Beer et al. |
| 4,656,010 A | 4/1987 | Leitzke et al. |
| 4,657,738 A | 4/1987 | Kanter et al. |
| 4,659,342 A | 4/1987 | Lind |
| 4,662,903 A | 5/1987 | Yanagawa |
| 4,666,474 A | 5/1987 | Cook |
| 4,668,479 A | 5/1987 | Manabe et al. |
| 4,670,026 A | 6/1987 | Hoenig |
| 4,674,003 A | 6/1987 | Zylka |
| 4,680,496 A | 7/1987 | Letournel et al. |
| 4,686,370 A | 8/1987 | Blach |
| 4,689,056 A * | 8/1987 | Noguchi et al. ................ 96/79 |
| 4,691,829 A | 9/1987 | Auer |
| 4,692,174 A | 9/1987 | Gelfand et al. |
| 4,693,869 A | 9/1987 | Pfaff |
| 4,694,376 A | 9/1987 | Gesslauer |
| 4,702,752 A | 10/1987 | Yanagawa |

| | | | | | |
|---|---|---|---|---|---|
| 4,713,092 A | 12/1987 | Kikuchi et al. | 5,180,404 A | 1/1993 | Loreth et al. |
| 4,713,093 A | 12/1987 | Hansson | 5,183,480 A | 2/1993 | Raterman et al. |
| 4,713,724 A | 12/1987 | Voelkel | 5,196,171 A | 3/1993 | Peltier |
| 4,715,870 A | 12/1987 | Masuda et al. | 5,198,003 A | 3/1993 | Haynes |
| 4,725,289 A | 2/1988 | Quintilian | 5,199,257 A | 4/1993 | Colletta et al. |
| 4,726,812 A | 2/1988 | Hirth | 5,210,678 A | 5/1993 | Lain et al. |
| 4,726,814 A | 2/1988 | Weitman | 5,215,558 A | 6/1993 | Moon |
| 4,736,127 A | 4/1988 | Jacobsen | 5,217,504 A | 6/1993 | Johansson |
| 4,743,275 A | 5/1988 | Flanagan | 5,217,511 A | 6/1993 | Plaks et al. |
| 4,749,390 A | 6/1988 | Burnett et al. | 5,234,555 A | 8/1993 | Ibbott |
| 4,750,921 A | 6/1988 | Sugita et al. | 5,248,324 A | 9/1993 | Hara |
| 4,760,302 A | 7/1988 | Jacobsen | 5,250,267 A | 10/1993 | Johnson et al. |
| 4,760,303 A | 7/1988 | Miyake | 5,254,155 A | 10/1993 | Mensi |
| 4,765,802 A | 8/1988 | Gombos et al. | 5,266,004 A | 11/1993 | Tsumurai et al. |
| 4,771,361 A | 9/1988 | Varga | 5,271,763 A | 12/1993 | Jang |
| 4,772,297 A | 9/1988 | Anzai | 5,282,891 A | 2/1994 | Durham |
| 4,779,182 A | 10/1988 | Mickal et al. | 5,290,343 A | 3/1994 | Morita et al. |
| 4,781,736 A | 11/1988 | Cheney et al. | 5,296,019 A | 3/1994 | Oakley et al. |
| 4,786,844 A | 11/1988 | Farrell et al. | 5,302,190 A | 4/1994 | Williams |
| 4,789,801 A * | 12/1988 | Lee .......................... 310/308 | 5,308,586 A | 5/1994 | Fritsche et al. |
| 4,808,200 A | 2/1989 | Dallhammer et al. | 5,315,838 A | 5/1994 | Thompson |
| 4,811,159 A | 3/1989 | Foster, Jr. | 5,316,741 A | 5/1994 | Sewell et al. |
| 4,822,381 A | 4/1989 | Mosley et al. | 5,330,559 A | 7/1994 | Cheney et al. |
| 4,853,005 A | 8/1989 | Jaisinghani et al. | 5,348,571 A | 9/1994 | Weber |
| 4,869,736 A | 9/1989 | Ivester et al. | 5,376,168 A | 12/1994 | Inculet |
| 4,892,713 A | 1/1990 | Newman | 5,378,978 A | 1/1995 | Gallo et al. |
| 4,929,139 A | 5/1990 | Vorreiter et al. | 5,386,839 A | 2/1995 | Chen |
| 4,940,470 A | 7/1990 | Jaisinghani et al. | 5,395,430 A | 3/1995 | Lundgren et al. |
| 4,940,894 A | 7/1990 | Morters | 5,401,301 A | 3/1995 | Schulmerich et al. |
| 4,941,068 A | 7/1990 | Hofmann | 5,401,302 A | 3/1995 | Schulmerich et al. |
| 4,941,224 A | 7/1990 | Saeki et al. | 5,403,383 A | 4/1995 | Jaisinghani |
| 4,944,778 A | 7/1990 | Yanagawa | 5,405,434 A | 4/1995 | Inculet |
| 4,954,320 A | 9/1990 | Birmingham et al. | 5,407,469 A | 4/1995 | Sun |
| 4,955,991 A | 9/1990 | Torok et al. | 5,407,639 A | 4/1995 | Watanabe et al. |
| 4,966,666 A | 10/1990 | Waltonen | 5,417,936 A | 5/1995 | Suzuki et al. |
| 4,967,119 A | 10/1990 | Torok et al. | 5,419,953 A | 5/1995 | Chapman |
| 4,976,752 A | 12/1990 | Torok et al. | 5,433,772 A | 7/1995 | Sikora |
| 4,978,372 A | 12/1990 | Pick | 5,435,817 A | 7/1995 | Davis et al. |
| D315,598 S | 3/1991 | Yamamoto et al. | 5,435,978 A | 7/1995 | Yokomi |
| 5,003,774 A | 4/1991 | Leonard | 5,437,713 A | 8/1995 | Chang |
| 5,006,761 A | 4/1991 | Torok et al. | 5,437,843 A | 8/1995 | Kuan |
| 5,010,869 A | 4/1991 | Lee | 5,445,798 A | 8/1995 | Ikeda et al. |
| 5,012,093 A | 4/1991 | Shimizu | 5,466,279 A | 11/1995 | Hattori et al. |
| 5,012,094 A | 4/1991 | Hamade | 5,468,454 A | 11/1995 | Kim |
| 5,012,159 A | 4/1991 | Torok et al. | 5,474,599 A | 12/1995 | Cheney et al. |
| 5,022,979 A | 6/1991 | Hijikata et al. | 5,484,472 A | 1/1996 | Weinberg |
| 5,024,685 A | 6/1991 | Torok et al. | 5,484,473 A | 1/1996 | Bontempi |
| 5,030,254 A | 7/1991 | Heyen et al. | 5,492,678 A | 2/1996 | Ota et al. |
| 5,034,033 A | 7/1991 | Alsup et al. | 5,501,844 A | 3/1996 | Kasting, Jr. et al. |
| 5,037,456 A | 8/1991 | Yu | 5,503,808 A | 4/1996 | Garbutt et al. |
| 5,045,095 A | 9/1991 | You | 5,503,809 A | 4/1996 | Coate et al. |
| 5,053,912 A | 10/1991 | Loreth et al. | 5,505,914 A | 4/1996 | Tona-Serra |
| 5,059,219 A | 10/1991 | Plaks et al. | 5,508,008 A | 4/1996 | Wasser |
| 5,061,462 A | 10/1991 | Suzuki | 5,514,345 A | 5/1996 | Garbutt et al. |
| 5,066,313 A | 11/1991 | Mallory, Sr. | 5,516,493 A | 5/1996 | Bell et al. |
| 5,072,746 A | 12/1991 | Kantor | 5,518,531 A | 5/1996 | Joannu |
| 5,076,820 A | 12/1991 | Gurvitz | 5,520,887 A | 5/1996 | Shimizu et al. |
| 5,077,468 A | 12/1991 | Hamade | 5,525,310 A | 6/1996 | Decker et al. |
| 5,077,500 A | 12/1991 | Torok et al. | 5,529,613 A | 6/1996 | Yavnieli |
| 5,100,440 A | 3/1992 | Stahel et al. | 5,529,760 A | 6/1996 | Burris |
| RE33,927 E | 5/1992 | Fuzimura | 5,532,798 A | 7/1996 | Nakagami et al. |
| D326,514 S | 5/1992 | Alsup et al. | 5,535,089 A | 7/1996 | Ford et al. |
| 5,118,942 A | 6/1992 | Hamade | 5,536,477 A | 7/1996 | Cha et al. |
| 5,125,936 A | 6/1992 | Johansson | 5,538,695 A | 7/1996 | Shinjo et al. |
| 5,136,461 A | 8/1992 | Zellweger | 5,540,761 A | 7/1996 | Yamamoto |
| 5,137,546 A | 8/1992 | Steinbacher et al. | 5,542,967 A | 8/1996 | Ponizovsky et al. |
| 5,141,529 A | 8/1992 | Oakley et al. | 5,545,379 A | 8/1996 | Gray |
| 5,141,715 A | 8/1992 | Sackinger et al. | 5,545,380 A | 8/1996 | Gray |
| D329,284 S | 9/1992 | Patton | 5,547,643 A | 8/1996 | Nomoto et al. |
| 5,147,429 A | 9/1992 | Bartholomew et al. | 5,549,874 A | 8/1996 | Kamiya et al. |
| 5,154,733 A | 10/1992 | Fujii et al. | 5,554,344 A | 9/1996 | Duarte |
| 5,158,580 A | 10/1992 | Chang | 5,554,345 A | 9/1996 | Kitchenman |
| D332,655 S | 1/1993 | Lytle et al. | 5,569,368 A | 10/1996 | Larsky et al. |

| Patent | Kind | Date | Inventor |
|---|---|---|---|
| 5,569,437 | A | 10/1996 | Stiehl et al. |
| D375,546 | S | 11/1996 | Lee |
| 5,571,483 | A | 11/1996 | Pfingstl et al. |
| 5,573,577 | A | 11/1996 | Joannou |
| 5,573,730 | A | 11/1996 | Gillum |
| 5,578,112 | A | 11/1996 | Krause |
| 5,578,280 | A | 11/1996 | Kazi et al. |
| 5,582,632 | A | 12/1996 | Nohr et al. |
| 5,587,131 | A | 12/1996 | Malkin et al. |
| D377,523 | S | 1/1997 | Marvin et al. |
| 5,591,253 | A | 1/1997 | Altman et al. |
| 5,591,334 | A | 1/1997 | Shimizu et al. |
| 5,591,412 | A | 1/1997 | Jones et al. |
| 5,593,476 | A | 1/1997 | Coppom |
| 5,601,636 | A | 2/1997 | Glucksman |
| 5,603,752 | A | 2/1997 | Hara |
| 5,603,893 | A | 2/1997 | Gundersen et al. |
| 5,614,002 | A | 3/1997 | Chen |
| 5,624,476 | A | 4/1997 | Eyraud |
| 5,630,866 | A | 5/1997 | Gregg |
| 5,630,990 | A | 5/1997 | Conrad et al. |
| 5,637,198 | A | 6/1997 | Breault |
| 5,637,279 | A | 6/1997 | Besen et al. |
| 5,641,342 | A | 6/1997 | Smith et al. |
| 5,641,461 | A | 6/1997 | Ferone |
| 5,647,890 | A | 7/1997 | Yamamoto |
| 5,648,049 | A | 7/1997 | Jones et al. |
| 5,655,210 | A | 8/1997 | Gregoire et al. |
| 5,656,063 | A | 8/1997 | Hsu |
| 5,665,147 | A | 9/1997 | Taylor et al. |
| 5,667,563 | A | 9/1997 | Silva, Jr. |
| 5,667,564 | A | 9/1997 | Weinberg |
| 5,667,565 | A | 9/1997 | Gondar |
| 5,667,756 | A | 9/1997 | Ho |
| 5,669,963 | A | 9/1997 | Horton et al. |
| 5,678,237 | A | 10/1997 | Powell et al. |
| 5,681,434 | A | 10/1997 | Eastlund |
| 5,681,533 | A | 10/1997 | Hiromi |
| 5,698,164 | A | 12/1997 | Kishioka et al. |
| 5,702,507 | A | 12/1997 | Wang |
| D389,567 | S | 1/1998 | Gudefin |
| 5,766,318 | A | 6/1998 | Loreth et al. |
| 5,779,769 | A | 7/1998 | Jiang |
| 5,814,135 | A | 9/1998 | Weinberg |
| 5,879,435 | A | 3/1999 | Satyapal et al. |
| 5,893,977 | A | 4/1999 | Pucci |
| 5,911,957 | A | 6/1999 | Khatchatrian et al. |
| 5,972,076 | A | 10/1999 | Nichols et al. |
| 5,975,090 | A | 11/1999 | Taylor et al. |
| 5,980,614 | A | 11/1999 | Loreth et al. |
| 5,993,521 | A | 11/1999 | Loreth et al. |
| 5,997,619 | A | 12/1999 | Knuth et al. |
| 6,019,815 | A | 2/2000 | Satyapal et al. |
| 6,042,637 | A | 3/2000 | Weinberg |
| 6,063,168 | A | 5/2000 | Nichols et al. |
| 6,086,657 | A | 7/2000 | Freije |
| 6,117,216 | A | 9/2000 | Loreth |
| 6,118,645 | A | 9/2000 | Partridge |
| 6,126,722 | A | 10/2000 | Mitchell et al. |
| 6,126,727 | A | 10/2000 | Lo |
| 6,149,717 | A | 11/2000 | Satyapal et al. |
| 6,149,815 | A | 11/2000 | Sauter |
| 6,152,146 | A | 11/2000 | Taylor et al. |
| 6,163,098 | A | 12/2000 | Taylor et al. |
| 6,176,977 | B1 * | 1/2001 | Taylor et al. ............ 204/176 |
| 6,182,461 | B1 | 2/2001 | Washburn et al. |
| 6,182,671 | B1 | 2/2001 | Taylor et al. |
| 6,193,852 | B1 | 2/2001 | Caracciolo et al. |
| 6,203,600 | B1 | 3/2001 | Loreth |
| 6,212,883 | B1 | 4/2001 | Kang |
| 6,228,149 | B1 | 5/2001 | Alenichev et al. |
| 6,252,012 | B1 | 6/2001 | Egitto et al. |
| 6,270,733 | B1 | 8/2001 | Rodden |
| 6,277,248 | B1 | 8/2001 | Ishioka et al. |
| 6,282,106 | B2 | 8/2001 | Grass |
| D449,097 | S | 10/2001 | Smith et al. |
| D449,679 | S | 10/2001 | Smith et al. |
| 6,296,692 | B1 | 10/2001 | Gutmann |
| 6,302,944 | B1 | 10/2001 | Hoenig |
| 6,309,514 | B1 | 10/2001 | Conrad et al. |
| 6,312,507 | B1 | 11/2001 | Taylor et al. |
| 6,315,821 | B1 | 11/2001 | Pillion et al. |
| 6,328,791 | B1 | 12/2001 | Pillion et al. |
| 6,348,103 | B1 | 2/2002 | Ahlborn et al. |
| 6,350,417 | B1 | 2/2002 | Lau et al. |
| 6,362,604 | B1 | 3/2002 | Cravey |
| 6,372,097 | B1 | 4/2002 | Chen |
| 6,373,723 | B1 | 4/2002 | Wallgren et al. |
| 6,379,427 | B1 | 4/2002 | Siess |
| 6,391,259 | B1 | 5/2002 | Malkin et al. |
| 6,398,852 | B1 | 6/2002 | Loreth |
| 6,447,587 | B1 | 9/2002 | Pillion et al. |
| 6,451,266 | B1 | 9/2002 | Lau et al. |
| 6,464,754 | B1 | 10/2002 | Ford |
| 6,471,753 | B1 | 10/2002 | Ahn et al. |
| 6,494,940 | B1 | 12/2002 | Hak |
| 6,504,308 | B1 | 1/2003 | Krichtafovitch et al. |
| 6,508,982 | B1 | 1/2003 | Shoji |
| 6,544,485 | B1 * | 4/2003 | Taylor ............... 422/186.04 |
| 6,585,935 | B1 | 7/2003 | Taylor et al. |
| 6,588,434 | B2 | 7/2003 | Taylor et al. |
| 6,603,268 | B2 | 8/2003 | Lee |
| 6,613,277 | B1 | 9/2003 | Monagan |
| 6,632,407 | B1 | 10/2003 | Lau et al. |
| 6,635,105 | B2 | 10/2003 | Ahlborn et al. |
| 6,672,315 | B2 | 1/2004 | Taylor et al. |
| 6,709,484 | B2 | 3/2004 | Lau et al. |
| 6,713,026 | B2 | 3/2004 | Taylor et al. |
| 6,735,830 | B1 | 5/2004 | Merciel |
| 6,749,667 | B2 | 6/2004 | Reeves et al. |
| 6,753,652 | B2 | 6/2004 | Kim |
| 6,761,796 | B2 | 7/2004 | Srivastava et al. |
| 6,768,108 | B2 | 7/2004 | Hirano et al. |
| 6,768,110 | B2 | 7/2004 | Alani |
| 6,768,120 | B2 | 7/2004 | Leung et al. |
| 6,768,121 | B2 | 7/2004 | Horskey |
| 6,770,878 | B2 | 8/2004 | Uhlemann et al. |
| 6,774,359 | B1 | 8/2004 | Hirabayashi et al. |
| 6,777,686 | B2 | 8/2004 | Olson et al. |
| 6,777,699 | B1 | 8/2004 | Miley et al. |
| 6,777,882 | B2 | 8/2004 | Goldberg et al. |
| 6,781,136 | B1 | 8/2004 | Kato |
| 6,785,912 | B1 | 9/2004 | Julio |
| 6,791,814 | B2 | 9/2004 | Adachi et al. |
| 6,794,661 | B2 | 9/2004 | Tsukihara et al. |
| 6,797,339 | B2 | 9/2004 | Akizuki et al. |
| 6,797,964 | B2 | 9/2004 | Yamashita |
| 6,799,068 | B1 | 9/2004 | Hartmann et al. |
| 6,800,862 | B2 | 10/2004 | Matsumoto et al. |
| 6,803,585 | B2 | 10/2004 | Glukhoy |
| 6,805,916 | B2 | 10/2004 | Cadieu |
| 6,806,035 | B1 | 10/2004 | Atireklapvarodom et al. |
| 6,806,163 | B2 | 10/2004 | Wu et al. |
| 6,806,468 | B2 | 10/2004 | Laiko et al. |
| 6,808,606 | B2 | 10/2004 | Thomsen et al. |
| 6,809,310 | B2 | 10/2004 | Chen |
| 6,809,312 | B1 | 10/2004 | Park et al. |
| 6,809,325 | B2 | 10/2004 | Dahl et al. |
| 6,812,647 | B2 | 11/2004 | Cornelius |
| 6,815,690 | B2 | 11/2004 | Veerasamy et al. |
| 6,818,257 | B2 | 11/2004 | Amann et al. |
| 6,818,909 | B2 | 11/2004 | Murrell et al. |
| 6,819,053 | B2 | 11/2004 | Johnson |
| 6,863,869 | B2 | 3/2005 | Taylor et al. |
| 6,896,853 | B2 | 5/2005 | Lau et al. |
| 6,899,745 | B2 * | 5/2005 | Gatchell et al. ............ 95/76 |

| | | | |
|---|---|---|---|
| 6,911,186 B2 | 6/2005 | Taylor et al. | |
| 2001/0048906 A1 | 12/2001 | Lau et al. | |
| 2002/0069760 A1 | 6/2002 | Pruette et al. | |
| 2002/0079212 A1 | 6/2002 | Taylor et al. | |
| 2002/0098131 A1 | 7/2002 | Taylor et al. | |
| 2002/0122751 A1 | 9/2002 | Sinaiko et al. | |
| 2002/0122752 A1 | 9/2002 | Taylor et al. | |
| 2002/0127156 A1 | 9/2002 | Taylor | |
| 2002/0134664 A1 | 9/2002 | Taylor et al. | |
| 2002/0134665 A1 | 9/2002 | Taylor et al. | |
| 2002/0141914 A1 | 10/2002 | Lau et al. | |
| 2002/0144601 A1 | 10/2002 | Palestro et al. | |
| 2002/0146356 A1 | 10/2002 | Sinaiko et al. | |
| 2002/0150520 A1 | 10/2002 | Taylor et al. | |
| 2002/0152890 A1 | 10/2002 | Leiser | |
| 2002/0155041 A1 | 10/2002 | McKinney, Jr. et al. | |
| 2002/0170435 A1 | 11/2002 | Joannou | |
| 2002/0190658 A1 | 12/2002 | Lee | |
| 2002/0195951 A1 | 12/2002 | Lee | |
| 2003/0005824 A1 | 1/2003 | Katou et al. | |
| 2003/0170150 A1 | 9/2003 | Law et al. | |
| 2003/0206837 A1 | 11/2003 | Taylor et al. | |
| 2003/0206839 A1 | 11/2003 | Taylor et al. | |
| 2003/0206840 A1 | 11/2003 | Taylor et al. | |
| 2004/0033176 A1 | 2/2004 | Lee et al. | |
| 2004/0052700 A1 | 3/2004 | Kotlyar et al. | |
| 2004/0065202 A1 | 4/2004 | Gatchell et al. | |
| 2004/0096376 A1 | 5/2004 | Taylor | |
| 2004/0136863 A1 | 7/2004 | Yates et al. | |
| 2004/0166037 A1 | 8/2004 | Youdell et al. | |
| 2004/0226447 A1 | 11/2004 | Lau et al. | |
| 2004/0234431 A1 | 11/2004 | Taylor et al. | |
| 2004/0237787 A1 | 12/2004 | Reeves et al. | |
| 2004/0251124 A1 | 12/2004 | Lau | |
| 2004/0251909 A1 | 12/2004 | Taylor et al. | |
| 2005/0000793 A1 | 1/2005 | Taylor et al. | |

FOREIGN PATENT DOCUMENTS

| | | |
|---|---|---|
| CN | 87210843 U | 7/1988 |
| CN | 2138764 Y | 6/1993 |
| CN | 2153231 Y | 12/1993 |
| DE | 2206057 | 8/1973 |
| DE | 197 41 621 C1 | 6/1999 |
| EP | 0433152 A1 | 12/1990 |
| EP | 0332624 B1 | 1/1992 |
| FR | 2690509 | 10/1993 |
| GB | 643363 | 9/1950 |
| JP | S51-90077 | 8/1976 |
| JP | S62-20653 | 2/1987 |
| JP | S63-164948 | 10/1988 |
| JP | 10137007 | 5/1998 |
| JP | 11104223 | 4/1999 |
| JP | 2000236914 | 9/2000 |
| WO | WO 92/05875 A1 | 4/1992 |
| WO | WO 96/04703 A1 | 2/1996 |
| WO | WO 99/07474 A1 | 2/1999 |
| WO | WO 00/10713 A1 | 3/2000 |
| WO | WO 01/47803 A1 | 7/2001 |
| WO | WO 01/48781 A1 | 7/2001 |
| WO | WO 01/64349 A1 | 9/2001 |
| WO | WO 01/85348 A2 | 11/2001 |
| WO | WO 02/20162 A2 | 3/2002 |
| WO | WO 02/20163 A2 | 3/2002 |
| WO | WO 02/30574 A1 | 4/2002 |
| WO | WO 02/32578 A1 | 4/2002 |
| WO | WO 02/42003 A1 | 5/2002 |
| WO | WO 02/066167 A1 | 8/2002 |
| WO | WO 03/009944 A1 | 2/2003 |
| WO | WO 03/013620 A1 | 2/2003 |
| WO | WO 03/013734 AA | 2/2003 |

OTHER PUBLICATIONS

U.S. Appl. No. 60/306,479, filed Jul. 18, 2001, Taylor.
U.S. Appl. No. 60/341,179, filed Dec. 13, 2001, Taylor et al.
U.S. Appl. No. 60/340,702, filed Dec. 13, 2001, Taylor et al.
U.S. Appl. No. 60/341,377, filed Dec. 13, 2001, Taylor et al.
U.S. Appl. No. 60/341,518, filed Dec. 13, 2001, Taylor.
U.S. Appl. No. 60/340,288, filed Dec. 13, 2001, Taylor.
U.S. Appl. No. 60/341,176, filed Dec. 13, 2001, Taylor.
U.S. Appl. No. 60/340,462, filed Dec. 13, 2001, Taylor
U.S. Appl. No. 60/340,090, filed Dec. 13, 2001, Taylor.
U.S. Appl. No. 60/341,433, filed Dec. 13, 2001, Taylor.
U.S. Appl. No. 60/341,592, filed Dec. 13, 2001, Taylor
U.S. Appl. No. 60/341,320, filed Dec. 13, 2001, Taylor.
U.S. Appl. No. 60/391,070, filed Jun. 6, 2002, Reeves.
Blueair AV 402 Air Purifier, http://www.air-purifiers-usa.biz/Blueair_AV402.htm, 4 pp., 1996.
Blueair AV 501 Air Purifier, http://www.air-purifiers-usa.biz/Blueair_AV501.htm, 15 pp., 1997.
ConsumerReports.org, "Air Cleaners: Behind the Hype," http://www.consumerreports.org/main/content/printable.jsp?FOLDER%3C%3EFOLDER_id, Oct. 2003, 6 pp.
Electrical schematic and promotional material available from Zenion Industries, 7 pages, Aug. 1990.
English Translation of German Patent Document DE 197 41 621 C1; Publication Date: Jun. 10, 1999.
English Translation of German Published Patent Application 2206057; Publication Date: Aug. 16, 1973.
English Translation of Japanese Unexamined Patent Application Bulletin No. S51-90077; Publication Date: Aug. 6, 1976.
English Translation of Japanese Unexamined Utility Model Application No. S62-20653; Publication Date: Feb. 7, 1987.
English Translation of Japanese Unexamined Utility Model Application No. S63-164948; Publication Date: Oct. 27, 1988.
Friedrich C-90A Electronic Air Cleaner, Service Information, Friedrich Air Conditioning Co., 12 pp., 1985.
Friedrich C-90A, "How the C-90A Works," BestAirCleaner.com http://www.bestaircleaner.com/faq/c90works.asp, 1 page.
"Household Air Cleaners," Consumer Reports Magazine, Oct. 1992, 6 pp.
LakeAir Excel and Maxum Portable Electronic Air Cleaners, Operating and Service Manual, LakeAir International, Inc., 11 pp., 1971.
Lentek Sila™ Plug-In Air Purifier/Deodorizer product box copyrighted 1999, 13 pages.
Promotional material available from Zenion Industries for the Plasma-Pure 100/200/300, 2 pages, Aug. 1990.
Promotional material available from Zenion Industries for the Plasma-Tron, 2 pages, Aug. 1990.
Trion 120 Air Purifier, Model 442501-025, http://www.feddersoutled.com/trion120.html, 16 pp., believed to be at least one year prior to Nov. 5, 1998.
Trion 150 Air Purifier, Model 45000-002, http://www.feddersoutlet.com/trion150.html, 11 pp., believed to be at least one year prior to Nov. 5, 1998.
Trion 350 Air Purifier, Model 450111-010, http://www.feddersoutlet.com/trion350.html, 12 pp., believed to be at least one year prior to Nov. 5, 1998.
Trion Console 250 Electronic Air Cleaner, Model Series 442857 and 445600, Manual for Installation ·Operation ·Maintenance, Trion Inc., 7 pp., believed to be at least one year prior to Nov. 5, 1998.

* cited by examiner

AIR CONDITIONER DEVICE INCLUDING PIN-RING ELECTRODE CONFIGURATIONS WITH DRIVER ELECTRODE

CLAIM OF PRIORITY

This application is a continuation-in-part of U.S. patent application Ser. No. 10/791,561, now U.S. Pat. Ser. No. 7,517,503, filed Mar. 2, 2004, entitled "Electro-Kinetic Air Transporter and Conditioner Devices including Pin-Ring Electrode Configurations with Driver Electrode" and also claims priority under 35 USC 119(e) to U.S. Provisional Patent Application Ser. No. 60/591,031 filed Jul. 26, 2004, entitled, "Air Conditioner Devices Including Pin-Ring Electrode Configurations With Driver Electrode" both of which are hereby incorporated by reference.

CROSS-REFERENCE APPLICATIONS

The present invention is related to the following patent applications and patents, each of which is incorporated herein by reference:

U.S. patent application Ser. No. 10/074,207, filed Feb. 12, 2002, entitled "Electro-Kinetic Air Transporter-Conditioner Devices with Interstitial Electrode," is abandoned;

U.S. Pat. No. 6,176,977, entitled"Electro-Kinetic Air Transporter-Conditioner"issued on Jan. 23, 2001;

U.S. Pat. No. 6,544,485, entitled"Electro-Kinetic Device with Anti Microorganism Capability" issued on Apr. 8, 2003;

U.S. Pat. No. 6,911,186, entitled "Electro-Kinetic Air Device with Enhanced Housing Configuration and Enhanced Anti-Microorganism Capability" issued on Jun. 28, 2005;

U.S. patent application Ser. No. 10/17,420, filed Nov. 19, 2003, entitled "Electro-Kinetic Air Transporter And Conditioner Devices With Insulated Driver Electrodes", is abandoned;

U.S. Pat. No. 6,984,987, entitled "Electro-Kinetic Air Transporter And Conditioner Devices With Enhanced Arcing Detection And Suppression Features" issued on Jan. 10, 2006;

U.S. Pat. No. 6,350,417, entitled "Electrode Self Cleaning Mechanism For Electro-Kinetic Air Transporter-Conditioner" issued on May 4, 2000;

U.S. Pat. No. 6,709,484, entitled "Electrode Self-Cleaning Mechanism For Electro-Kinetic Air Transporter Conditioner Devices" issued on Mar. 23, 2004;

U.S. Pat. No. 6,350,417 entitled "Electrode Self Cleaning Mechanism For Electro-Kinetic Air Transporter-Conditioner" issued on May 4, 2000;

U.S. patent application Ser. No. 60/590,688, filed Jul. 23, 2004, entitled "Air Conditioner Device With Removable Driver Electrodes";

U.S. patent application Ser. No. 60/590,735, filed Jul. 23, 2003, entitled "Air Conditioner Device With Variable Voltage Controlled Trailing Electrodes";

U.S. patent application Ser. No. 60/590,960, filed Jul. 23, 2003, entitled "Air Conditioner Device With Removable Interstitial Driver Electrodes";

U.S. patent application Ser. No. 60/590,445, filed Jul. 23, 2003, entitled "Air Conditioner Device With Enhanced Germicidal Lamp";

U.S. co-pending patent application Ser. No. 11/004,397, filed Dec. 3, 2004, entitled "Air Conditioner Device With Enhanced Germicidal Lamp";

U.S. patent application Ser. No , filed 11/003,516, filed Dec. 3, 2004, entitled "Air Conditioner Device With Removable Driver Electrodes", is abandoned;

U.S. patent application Ser. No. 60/590,735, filed Jul. 23, 2004, entitled "Air Conditioner Device With Variable Voltage Controlled Trailing Electrodes";

U.S. patent application Ser. No. 11/003,034, filed Dec. 3, 2004, entitled "Air Conditioner Device With Individually Removable Driver Electrodes", is abandoned;

U.S. patent application Ser. No. 11/003,032, filed Dec. 3, 2004, entitled "Air Conditioner Device With Enhanced Germicidal Lamp", is abandoned; and U.S. patent application Ser. No. 11/003,894filed Dec. 3, 2004, entitled "Air Conditioner Device With Removable Driver Electrodes", is abandoned.

FIELD OF THE INVENTION

The present invention relates generally to devices that transport and/or condition air.

BACKGROUND OF THE INVENTION

It is known in the art to produce an airflow using electro-kinetic techniques, by which electrical power is converted into a flow of air without mechanically moving components. One such system was described in U.S. Pat. No. 4,789,801 to Lee (1988), depicted herein in simplified form as FIG. 1. System 100 includes a first array 110 of emitter electrodes 112 that are spaced-apart symmetrically from a second array 120 of collector electrodes 122. The positive terminal of a high voltage pulse generator 140 that outputs a train of high voltage pulses (e.g., 0 to perhaps +5 KV) is coupled to the first array 110, and the negative pulse generator terminal is coupled to the second array 120 in this example.

The high voltage pulses ionize the air between the arrays 110 and 120 and create an airflow 150 from the first array 110 toward the second array 120 without requiring any moving parts. Particulate matter 160 is entrained within the airflow 150 and also moves towards the collector electrodes 122. Some of the particulate matter is electrostatically attracted to the surfaces of the collector electrodes 122, where it remains, thus conditioning the flow of air exiting the system 100. Further, the corona discharge produced between the electrode arrays can release ozone into the ambient environment, which can eliminate odors that are entrained in the airflow. However, ozone production is generally undesirable in excess quantities.

In a further embodiment of Lee shown herein as FIG. 2, a third array 230 includes passive collector electrodes 232 that are positioned midway between each pair of collector electrodes 122. According to Lee, these passive collector electrodes 232, which were described as being grounded, increase precipitation efficiency. However, because the grounded passive collector electrodes 232 (also referred to hereafter as driver electrodes) are located close to adjacent negatively charged collector electrodes 122, undesirable arcing (also known as breakdown or sparking) may occur between the collector electrodes 122 and the driver electrodes 232. Arcing occurs if the potential difference between two or more electrodes is too high, or if a carbon path is produced between the electrode 122 and the electrode 232 (e.g., a moth or other insect getting stuck between the electrode 122 and the electrode 232).

Increasing the voltage difference between the driver electrodes 232 and the collector electrodes 122 is one way to further increase particle collecting efficiency and air flow rate. However, the extent that the voltage difference can be increased is limited, because arcing will eventually occur between the collector electrodes 122 and the driver electrodes 232. Such arcing will typically decrease the collecting efficiency of the system.

What is needed is a device having improved the particle collecting efficiency and/or air-flow rate generation.

DETAILED DESCRIPTION OF THE PRESENT INVENTION

Figure 1:
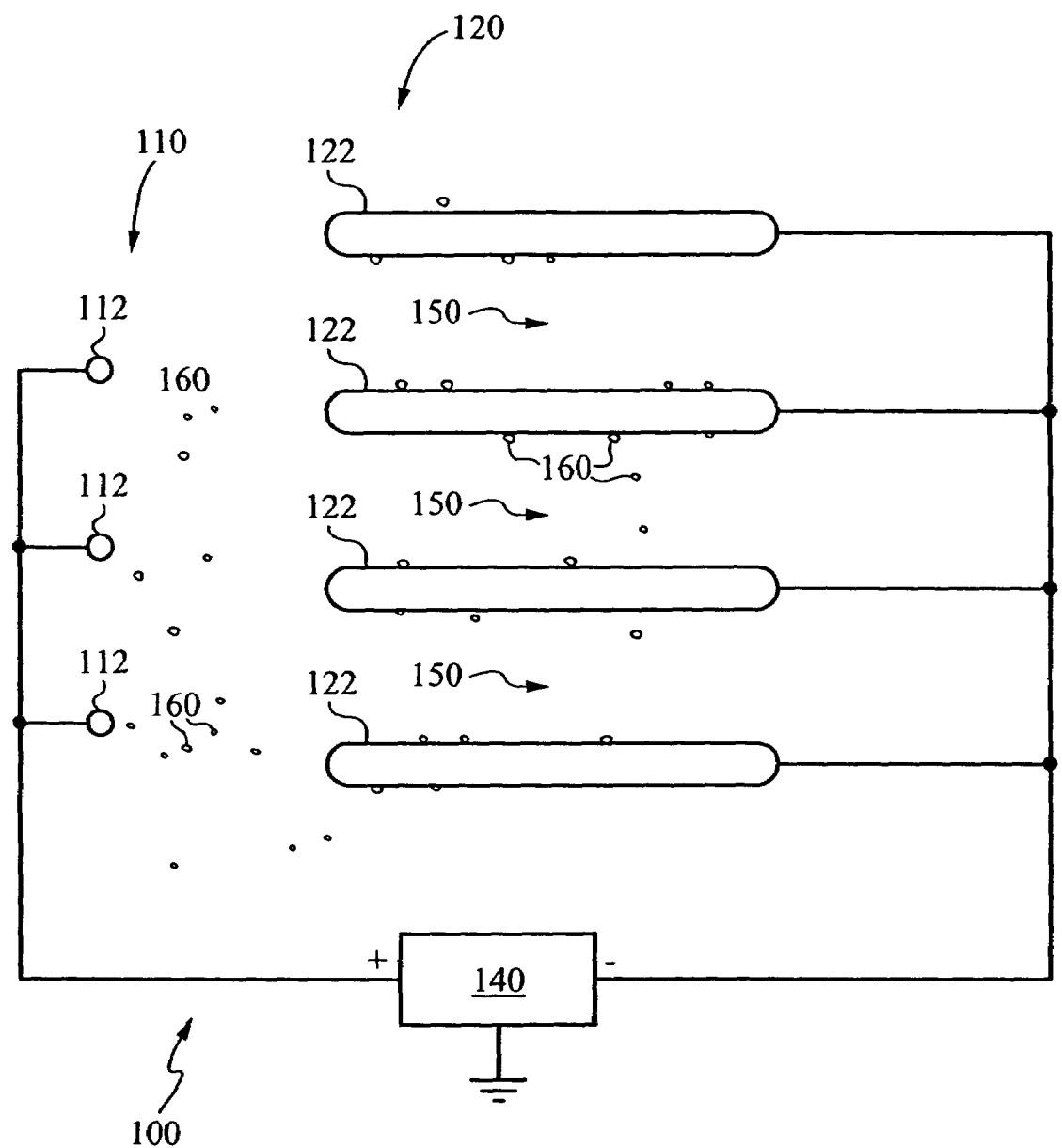
FIG. 1 illustrates schematically, a prior art electro-kinetic conditioner system.
Figure 2:
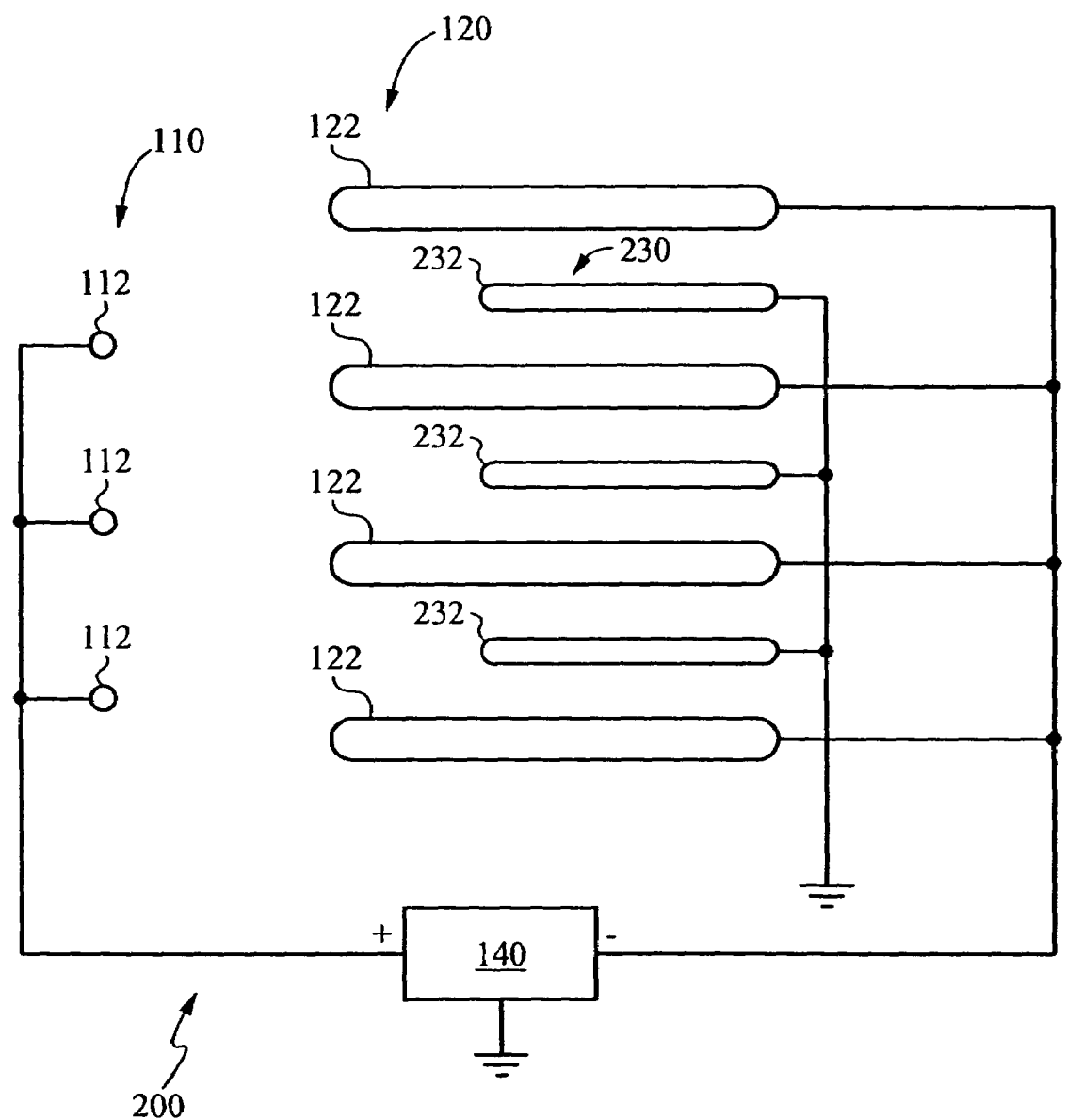
FIG. 2 illustrates schematically, a prior art electro-kinetic conditioner system.

Embodiments of the present invention are related to air conditioner systems and methods. In accordance with one embodiment of the present invention, a system includes at least one emitter electrode and at least one ring collector electrode that is downstream from the emitter electrode. The emitter electrode has a plurality of pins axially arranged about a center. A driver electrode is located within the interior of the collector electrode. Preferably, although not necessarily, the driver electrode is insulated. A high voltage source provides a voltage potential to at least one of the emitter electrode and the collector electrode to thereby provide a potential difference therebetween. The embodiments as described herein have some or all of the advantages of increasing the particle collection efficiency, increasing the rate and/or volume of airflow, reducing arcing, and/or reducing the amount of ozone generated. Further, ions generated using many of the embodiments of the present invention will be more of the negative variety as opposed to the positive variety.

An insulated driver electrode includes an underlying electrically conductive electrode that is covered with insulation, e.g., a dielectric material. The dielectric material can be, for example, a heat shrink tubing material or an insulating varnish type material. In accordance with one embodiment of the present invention, the dielectric material is coated with an ozone reducing catalyst. In accordance with another embodiment of the present invention, the dielectric material includes or is an ozone reducing catalyst.

Insulation on the driver electrode allows the voltage potential between the driver and collector electrodes to be increased to a voltage potential that would otherwise cause arcing if the insulation were not present. This increased voltage potential increases particle collection efficiency. Additionally, the insulation will reduce, and likely prevent, any arcing from occurring if a carbon path is formed between the collector electrode and driver electrode.

In accordance with one embodiment of the present invention, the emitter electrode and the driver electrode are grounded, whereas the high voltage source is used to provide a high voltage potential to the collector electrode (e.g., −16 KV). In accordance with one embodiment of the present invention, the emitter electrode is at a first voltage potential, the collector electrode is at a second voltage potential different than the first voltage potential, and the driver electrode is at a third voltage potential different than the first and second voltage potentials. One of the first, second and third voltage potentials can be at ground, but need not be. Other variations, such as the emitter electrode and driver electrode being at the same voltage potential (ground or otherwise) are within the scope of the invention.

It is within the scope of the invention to have an upstream end of the driver electrode substantially aligned with or set forward a distance from the upstream end of the ring collector electrode. However, the upstream end of the driver electrode is preferably set back a distance from the upstream end of the ring collector electrode. More specifically, the driver is preferably setback a sufficient distance such that the electric field between the emitter and collector electrodes does not interfere with the electric field between the driver and collector electrode, and vice versa.

Other features and advantages of the invention will appear from the following description in which the embodiments have been set forth in detail, in conjunction with the accompanying drawings and claims.

Figure 3:
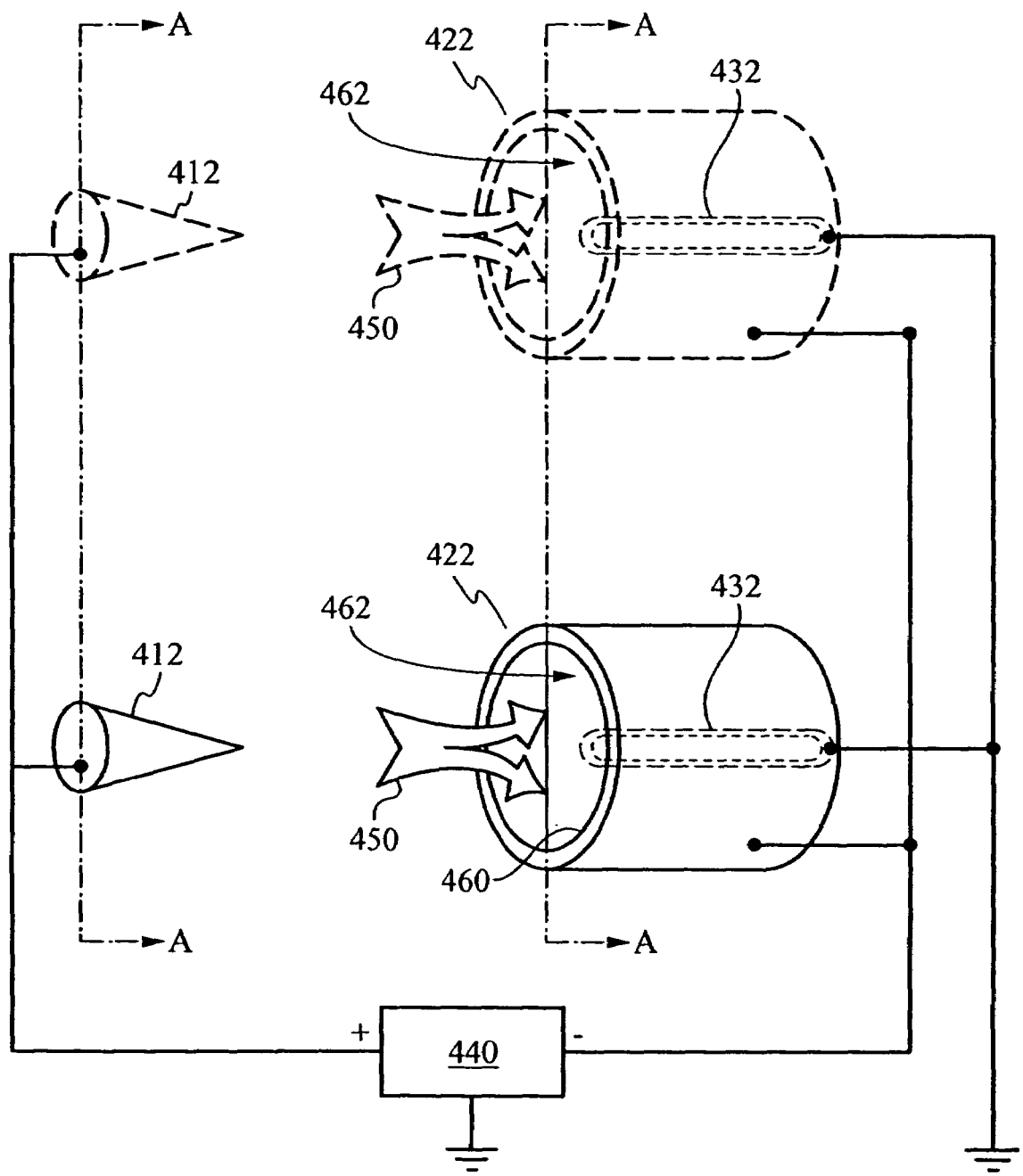
FIG. 3 illustrates an air-conditioner system according to one embodiment of the present invention.
Figure 4A:
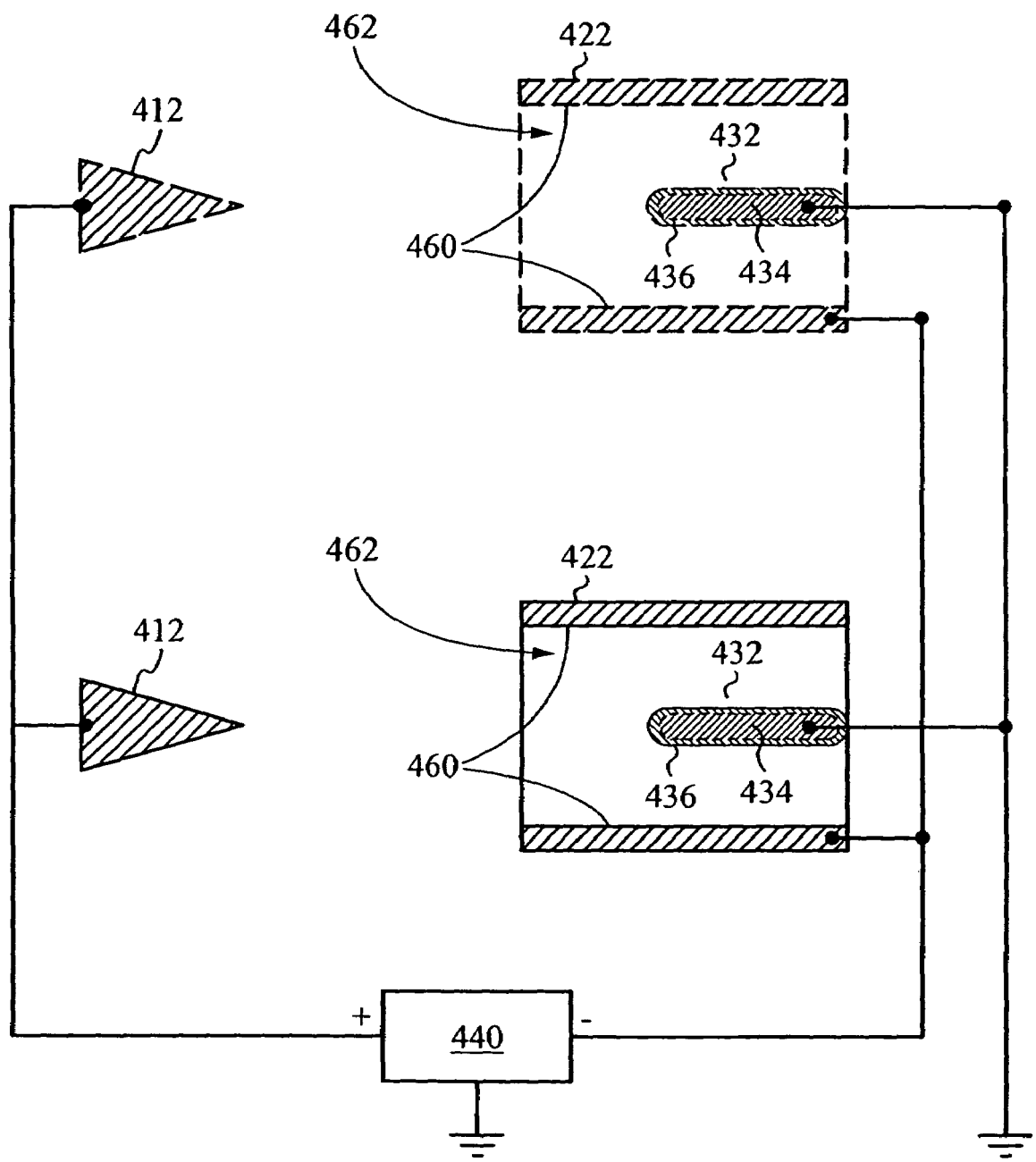
FIGS. 4A-4D illustrate various embodiments of the electrode assembly in accordance with the present invention.
Figure 4B:
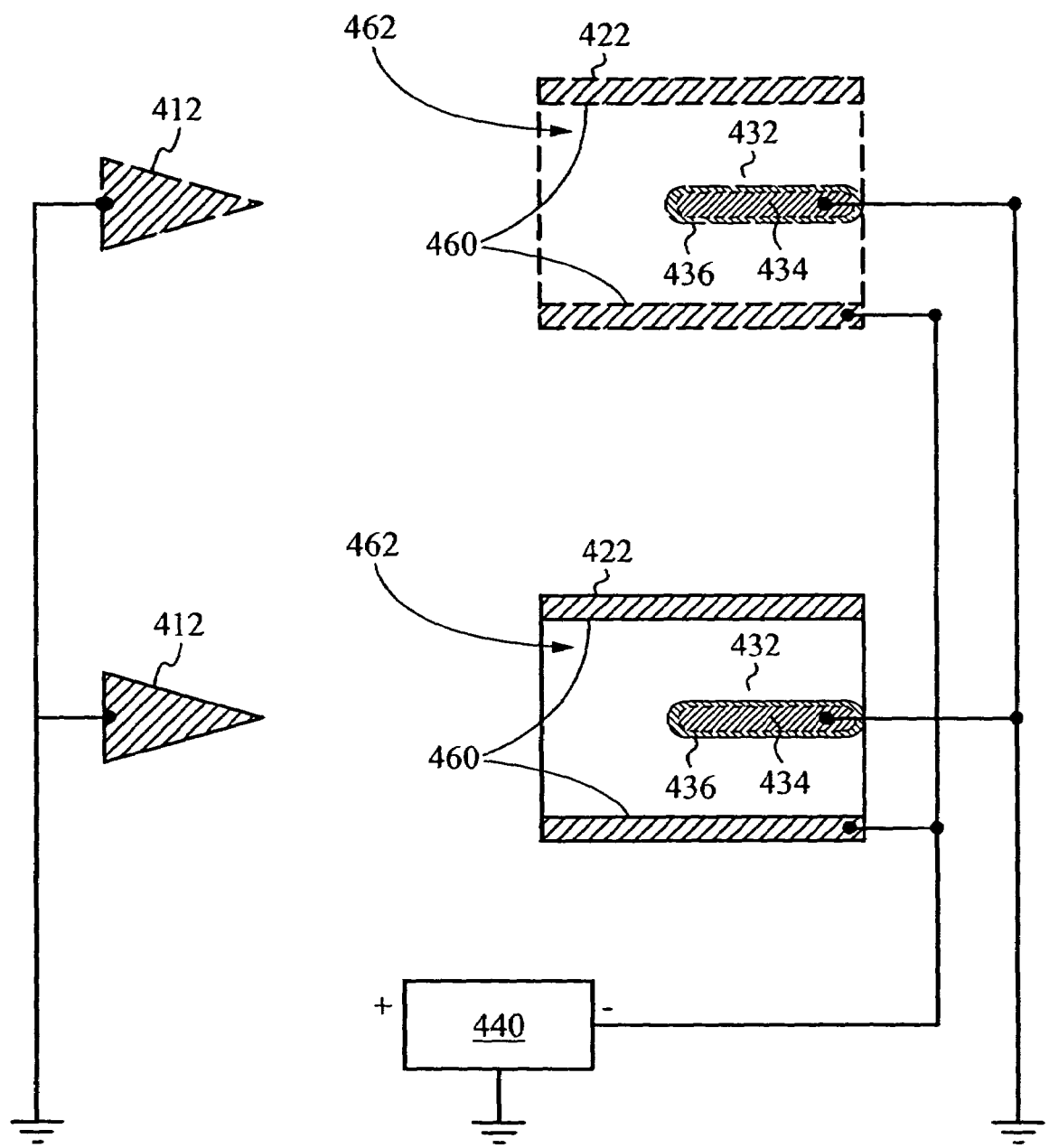

FIG. 3 shows a perspective view of an air conditioner system 400 according to one embodiment of the present invention. FIG. 4A is a cross-sectional side view of the system 400 shown in FIG. 3. The system 400 includes a pin emitter electrode 412, a ring collector electrode 422 and a driver electrode 432. The driver electrode 432 is located within (at least partially within) an interior 462 of the ring collector electrode 422. In one embodiment, the system 400 includes one pin emitter electrode 412, one ring collector electrode 422 and one driver electrode 432. Accordingly, the upper group of electrodes in FIGS. 4A and 4B is shown in dashed lines. However, it should also be understood that there could be two or more groups of electrodes (i.e., electrodes 412,422 and 432 can be repeated two or more times to produce a column, row, matrix, or other configuration of groups of electrodes). In another embodiment, there are multiple emitter electrodes 412 for one collector electrode 422, as discussed below. For simplicity, only the lower group of electrodes 412,422 and 432 will be discussed. One of ordinary skill in the art will appreciate that the upper group of electrodes 412,422 and 432 can be arranged in a similar manner and will operate in a similar manner.

The driver electrode 432 is preferably insulated with a dielectric material, thereby forming an insulated driver electrode, as shown in FIGS. 4A and 4B. However, the present invention also encompasses embodiments where the driver electrode 432 is not insulated. Increased particle collection efficiency should still be achieved using an un-insulated driver electrode 432. However, undesirable arcing (also known as breakdown or sparking) may occur between the driver electrode 432 and the surrounding ring collector electrode 422 if the potential difference therebetween is too high, or if a carbon path is produced between the electrodes. The insulation 436 (e.g., dielectric material) on the driver electrode 432 allows the voltage potential to be increased between the driver electrode and collector electrode, to a voltage potential that would otherwise cause arcing if the insulation were not present. This increased voltage potential further increases particle collection efficiency, as will be described below.

In the embodiment shown in FIGS. 4A and 4B, the pin emitter electrode 412 is shown as being connected to a positive terminal of a high voltage source 440, and the collector electrode 432 is shown connected to a negative terminal of the high voltage source 440. The insulated driver electrode 432 is shown as being grounded in FIGS. 4A and 4B.

During operation of the system 400, the high voltage source 440 produces a high voltage potential between the emitter electrode 412 and the ring collector electrode 422. More specifically, in the embodiment shown in FIGS. 3 and 4A, the high voltage source 440 positively charges the emitter electrode 412 and negatively charges the collector electrode 422. For example, the voltage to the emitter electrode 412 can be +6 KV, while the voltage to the collector electrode 422 can be –10 KV, resulting in a 16 KV potential difference between the emitter electrode 412 and the collector electrode 422. This potential difference produces a high intensity electric field that is highly concentrated around the pointed tip of the emitter electrode 412 which generally faces the collector electrode 422. More specifically, a corona discharge takes place from the pointed tip of the emitter electrode 412 to the upstream portion of the collector electrode 422, thereby producing an ionization region having positively charged ions therein. Particles (e.g., dust particles) in the vicinity of the emitter electrode 412 are thus positively charged by the ions as the particles travel through the ionization region. The positively charged ions are repelled by the positively charged emitter electrode 412, and are attracted to and deposited predominantly on the inner surface 460 of the negatively charged collector electrode 422.

A further electric field, referred to herein as the collection region, is produced between the driver electrode 432 and the collector electrode 422. The driver electrode 432 pushes the positively charged particles toward the inner surface 460 of the collector electrode 422. Generally, the greater the collection region between the driver electrode 432 and the collector electrode 422, the greater the particle collection efficiency of the collector electrode 422. If the driver electrode 432 is not insulated, then the extent that the voltage difference (and thus, the collection region) could be increased would be limited due to potential arcing between the collector electrode 422 and the un-insulated driver electrode. However, the insulation 436 covering the driver electrode 434 significantly increases the voltage potential difference that can be obtained between the collector electrode 422 and the driver electrode 432.

Although the emitter electrode 412 receives a positive voltage potential, the collector electrode 422 receives a negative voltage potential, and the insulated driver electrode 432 is grounded, other voltage potential variations are contemplated to drive the air system 400. Such other voltage potential variations will also produce a flow of ionized air from the emitter electrode 412 toward the collector electrode 422, so long as a high voltage differential is provided therebetween. Similarly, so long as a high voltage potential exists between the driver electrode 432 and the collector electrode 422, the driver electrode 432 will help increase collecting efficiency by pushing charged particles in the airflow toward the inside surface 460 of the collector electrode 422.

In one embodiment, the emitter electrode 412 and the driver electrode 432 are grounded, while the collector electrode 422 receives a high negative voltage potential, as shown in FIG. 4B. Such one embodiment is advantageous, because the emitter electrode 412 is generally at the same potential as the floor and walls of a room within which system is placed, reducing the chance that charged particles may flow backward, i.e., away from the collector electrode 422. Another advantage of the voltage arrangement in FIG. 4B is that only a single polarity voltage supply is needed. For example, the voltage source 440 only provides a –16 KV potential without requiring any positive supply potential. Thus, this voltage configuration is relatively simple to design, build and manufacture, thereby making it a cost-effective system.

Figure 4C:
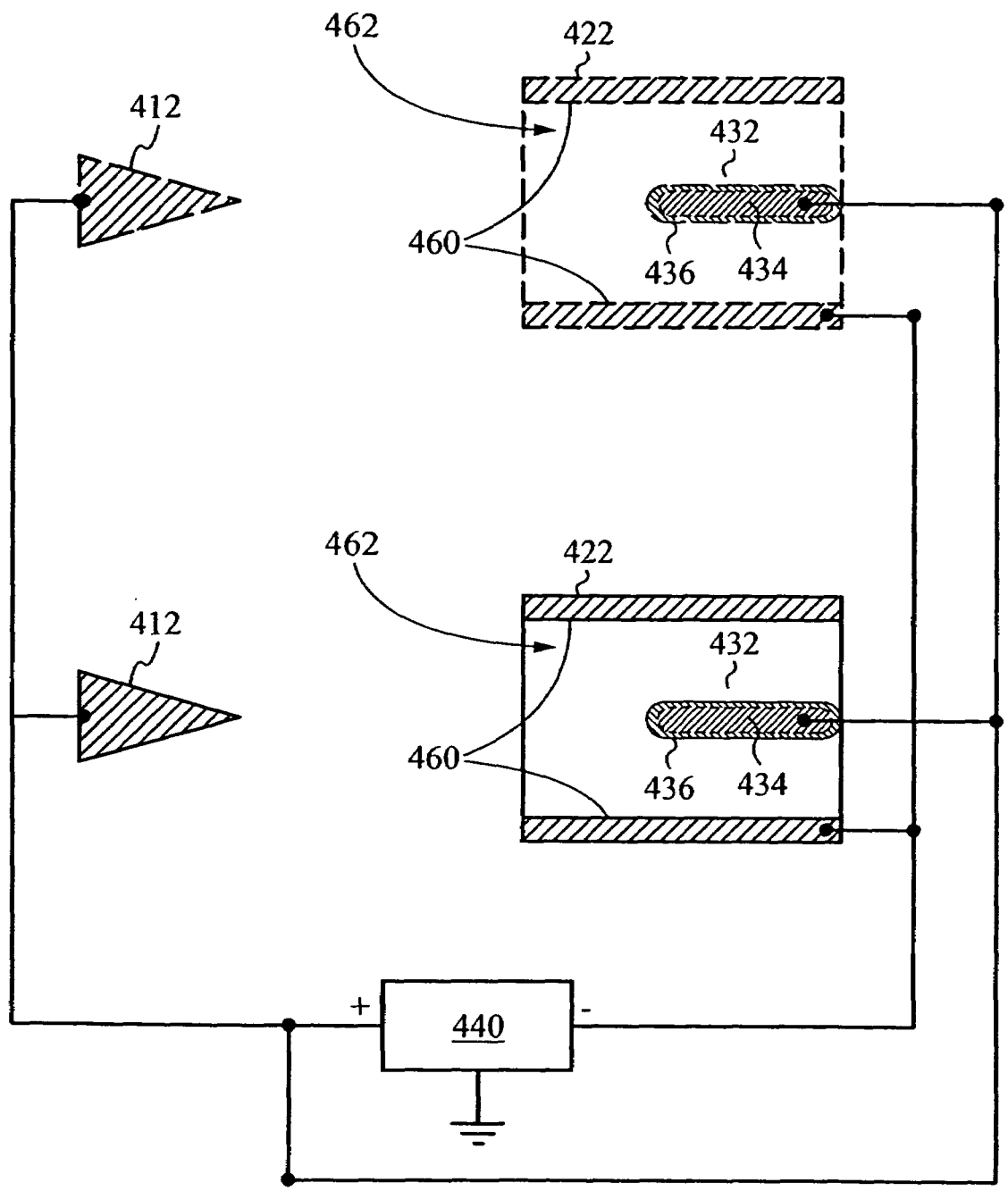

In one embodiment shown in FIG. 4C, the driver electrode 432 as well as the emitter electrode 412 is positively charged, whereas the collector electrode 422 is negatively charged. In particular, the driver electrode 432 is electrically coupled to the positive terminal of the voltage source 440. The emitter electrode 412 applies a positive charge to the particulates passing by the electrode 412. The collection region produced between the driver electrode 412 and the collector electrode 422 will thus push the positively charged particles toward the collector electrodes 422. Generally, the greater the collection region, the greater the airflow velocity and the particle collection efficiency of the system 400.

Figure 4D:
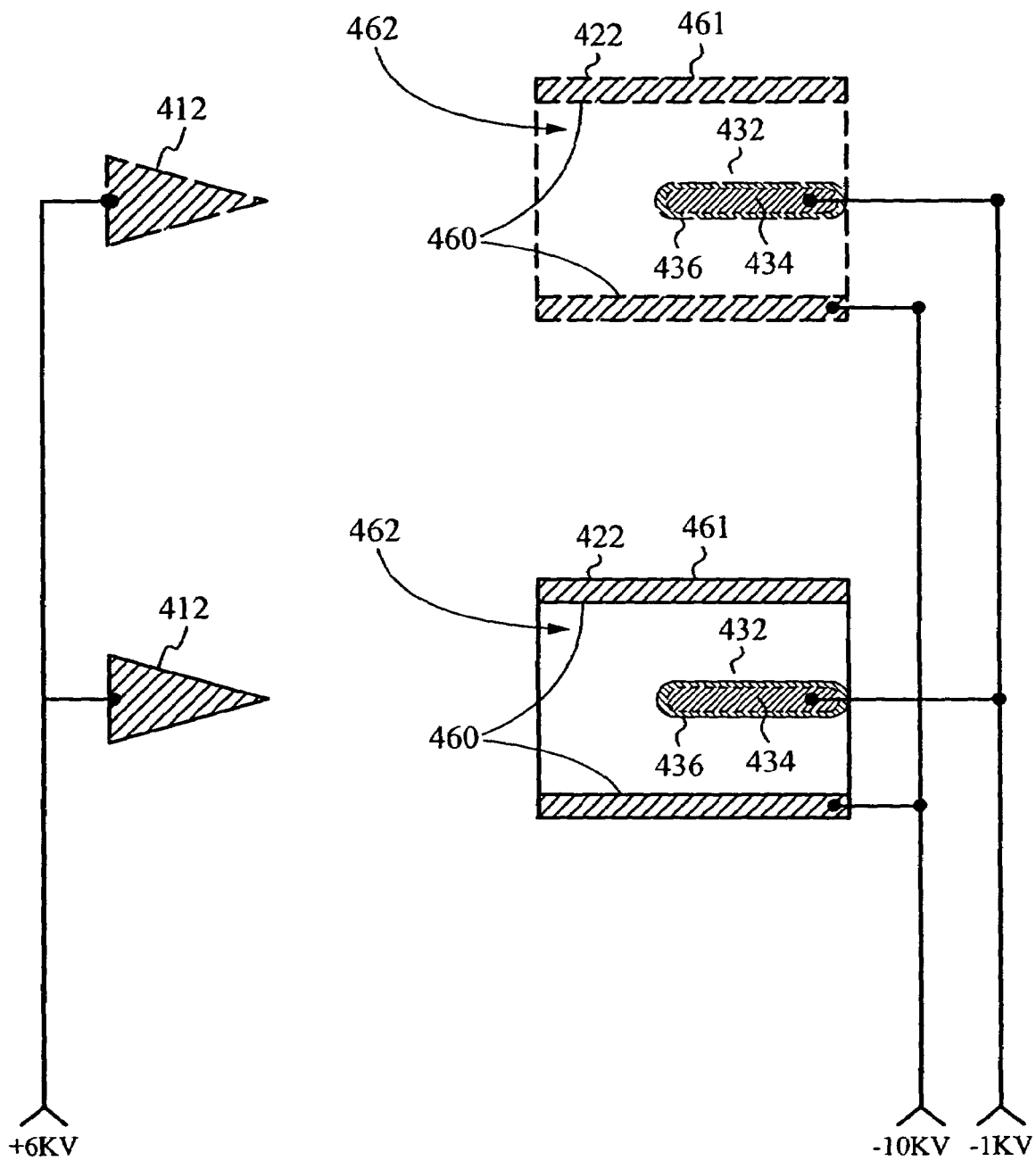

In another embodiment, shown in FIG. 4D, the emitter electrode 412 is positively charged (e.g., 6 KV), the driver electrode 432 is slightly negatively charged (e.g., –1 KV), and the collector electrode 422 is significantly more negatively charged (e.g., –10 KV). Other variations are also possible while still being within the spirit as scope of the present invention. It is also possible that the instead of grounding certain portions of the electrode arrangement, the entire arrangement can float (e.g., the driver electrode 432 and the emitter electrode 412 can be at a floating voltage potential with the collector electrode 422 being offset from the floating voltage potential).

If desired, the voltage potential of the emitter electrode 412 and the driver electrode 432 are independently adjustable. This allows for corona current adjustment (produced by the electric field between the emitter electrode 412 and collector electrode 422) to be performed independently of the adjustments to the collecting region between the driver electrode 432 and the collector electrode 422. More specifically, this allows the voltage potential between the emitter electrode 412 and the collector electrode 422 to be kept below arcing levels while still being able to independently increase the voltage potential between the driver electrode 432 and the collector electrode 422 to a higher voltage potential difference.

Figure 5:
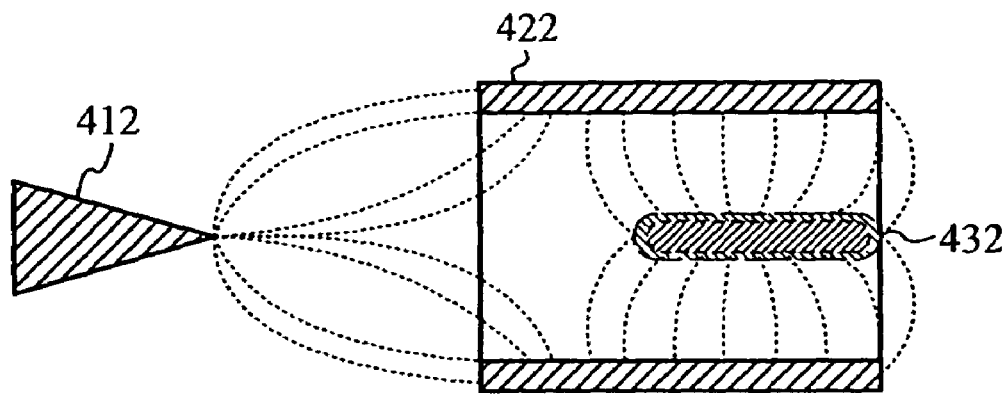
FIG. 5 illustrates exemplary electrostatic field lines produced using embodiments of the present invention.

FIG. 5 illustrates exemplary electrostatic field lines produced by the system of the present invention. The ionization region produces ions and cause air movement in a downstream direction from the emitter electrode 412 toward the collector electrode 422. Since the charged particles passing by the emitter electrode 412 have a polarity opposite than the polarity of the collector electrode 422, the charged particles will be attracted to the inner surface 460 of the collector electrode 422. Thus, at least a portion of the charged particles will collect on the inner surface 460 (also referred to as the interior surface) of the collector electrode 422, thereby cleaning the air. It is to be understood that charged particles will also collect on the outer surface 461 of the collector electrodes 422 (FIG. 4D).

The use of a driver electrode 432 increases the particle collection efficiency of the electrode assembly and reduces the percentage of particles that escape through the ring collector electrode 422. This is by the driver electrode 432 pushing particles in air flow toward the inside surface 460 of the collector electrode 422. As mentioned above, the driver electrode 432 is preferably insulated which further increases particle collection efficiency. Without the driver electrode 432, a percentage of the charged particles in the airflow may escape through the ring collector electrode 422 without being collected on the inner surface 460 of the collector electrode 422.

Figure 6:
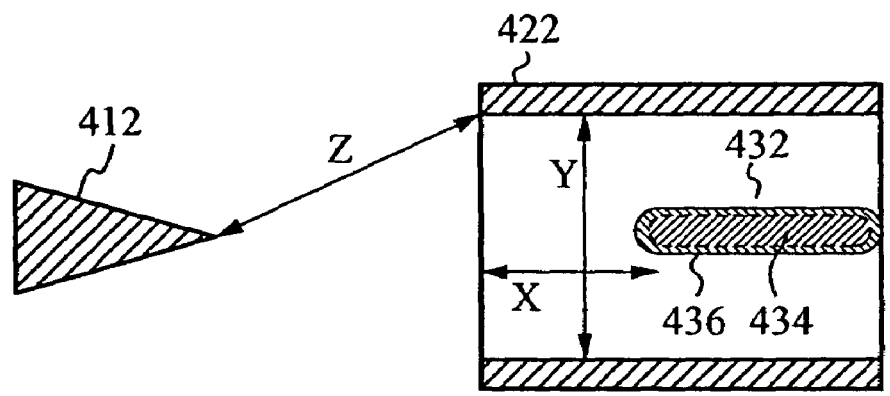
FIG. 6 illustrates the relative distances between various electrodes of the air-conditioner systems of the present invention.

It is preferred that the collecting region between the driver electrode 432 and the collector electrode 422 does not interfere with the ionization region between the emitter electrode 412 and the collector electrode 422. If this were to occur, the electric field in the collecting region might reduce the intensity of the electric field in the ionization region, thereby reducing the production of ions and slowing down the airflow rate. Accordingly, the leading end (i.e., upstream end) of the driver electrode 432 is preferably set back (i.e., downstream) from the leading end of the collector electrode 422 by a distance that is about the same as the diameter of the ring collector electrode 422. This is shown in FIG. 6, in which the setback distance X of the driver electrode 432 is approximately equal to the diameter Y of the ring collector electrode 422. Still referring to FIG. 6, it is also desirable to have the distance Z between the emitter electrode 412 and the collector electrode 422 to be about equal to the diameter Y of the ring collector electrode. However, other set back distances, diameters, and distances between the emitter and the collector electrodes 412, 422 are also within the spirit and scope of the present invention.

The downstream end of the driver electrode 432 is preferably even with the downstream end of the ring collector electrode 422 as shown in the figures. Alternatively, the downstream end the driver electrode 432 is positioned slightly upstream or downstream from the downstream end of the ring collector electrode 422. Where there is only one driver electrode 432 within (at least partially within) the interior 462 of the ring collector electrode 422, it is preferred that the driver electrode 432 is generally axially centered within the ring collector electrode 432 and generally parallel with the interior surface 460 of the ring collector electrode 422.

As explained above, the emitter electrode 412 and the driver electrode 432 may or may not be at the same voltage potential, depending on which embodiment of the present invention is practiced. When the emitter electrode 412 and the driver electrode 432 are at the same voltage potential, there will be no arcing which occurs between the emitter electrode 412 and the driver electrode 432. Further, even when at different voltage potentials, the collector electrode 422 will shield the driver electrode 432 because the driver electrode 432 is positioned downstream of the collector electrode 422, as can be appreciated from the electric field lines shown in FIG. 5.

In addition to producing ions, the systems described above will also produce ozone ($O_3$). While limited amounts of ozone are useful for eliminating odors, concentrations of ozone beyond recommended levels are generally undesirable.

In accordance with embodiments of the present invention, ozone production can be reduced by coating the driver electrode 432 with an ozone reducing catalyst. Exemplary ozone reducing catalysts include manganese dioxide and activated carbon. Commercially available ozone reducing catalysts such as PremAir™ manufactured by Englehard Corporation of Iselin, N.J., is alternatively used.

Some ozone reducing catalysts are electrically conductive, while others are not electrically conductive (e.g., manganese dioxide). If the desire is to provide a non-insulated driver electrode 432, then the underling electrically conductive electrode 434 can be coated in any available matter with an electrically conductive ozone reducing catalyst. However, if the desire is to provide an insulated driver electrode 432, it is important that an electrically conductive catalyst does not interfere with the benefits of insulating the driver. When using a catalyst that is not electrically conductive to coat an insulated driver electrode 432, the insulation 436 can be applied in any available manner. This is because the catalyst will act as an additional insulator and thus not defeat the purpose of adding the insulator 436.

Figure 7:
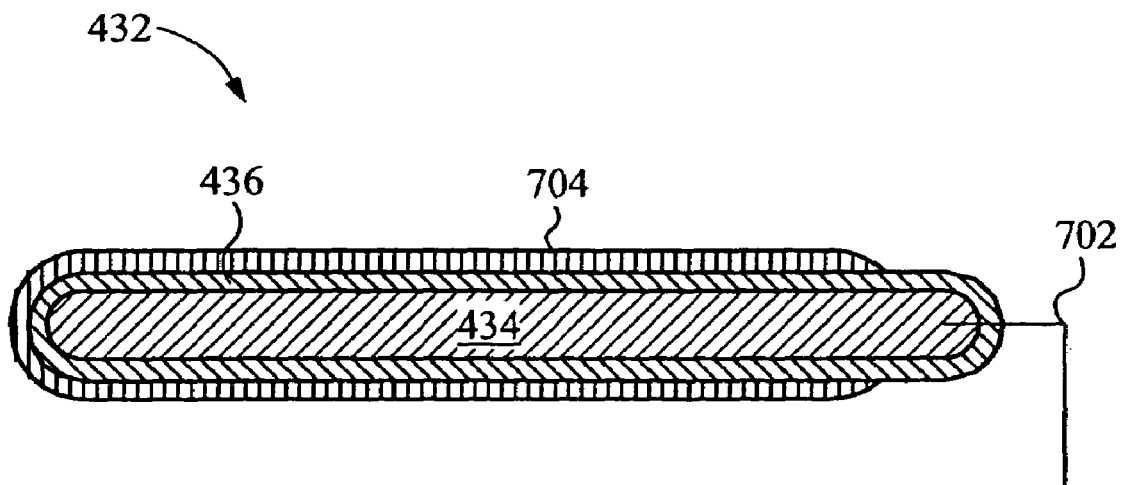
FIG. 7 illustrates a driver electrode that is coated with an ozone reducing catalyst, according to one embodiment of the present invention.

Referring now to FIG. 7, the insulated driver electrode 432 includes an electrically conductive electrode 434 that is covered by a dielectric material 436. In embodiments where the driver electrode 432 is not insulated, the driver electrode would simply include the electrically conductive electrode 434. In accordance with one embodiment of the present invention, the dielectric material 436 is a heat shrink material. During manufacture, the heat shrink material is placed over the electrically conductive electrode 434 and then heated, which causes the material to shrink to the shape of the electrode 434. An exemplary heat shrinkable material is type FP-301 flexible polyolefin material available from 3 M of St. Paul, Minn. It should be noted that any other appropriate heat shrinkable material is also contemplated.

In accordance with another embodiment of the present invention, the dielectric material 436 is an insulating varnish, lacquer or resin. For example, a varnish, after being applied to the surface of the underlying electrode 434, dries and forms an insulating coat or film which is a few mil (thousands of an inch) in thickness. The dielectric strength of the varnish or lacquer can be, for example, above 1000 V/mil (one thousands of an inch). Such insulating varnishes, lacquer and resins are commercially available from various sources, such as from John C. Dolph Company of Monmouth Junction, N.J., and Ranbar Electrical Materials Inc. of Manor, Pa. Other possible dielectric materials that can be used to insulate the driver electrode 432 include, but are not limited to, ceramic, porcelain enamel or fiberglass. These are just a few examples of dielectric materials that can be used to insulate the driver electrode 432.

The underlying electrode 434 is shown connected by a wire 702 (or other conductor) to a voltage potential (ground in this example). In this embodiment, an ozone reducing catalyst 704 covers most of the insulation 436. If the ozone reducing catalyst does not conduct electricity, then the ozone reducing catalyst 704 may contact the wire or other conductor 702 without negating the advantages of insulating the underlying driver electrode 434. However, if the ozone reducing catalyst 704 is electrically conductive, then care must be taken so that the electrically conductive ozone reducing catalyst 704 (covering the insulation 436) does not touch the wire or other conductor 702 that connects the underlying electrode 434 to the voltage source 440. So long as an electrically conductive ozone reducing catalyst is spaced far enough from the wire 704 to prevent voltage breakdown therebetween, then the potential of the electrically conductive ozone reducing catalyst will remain floating. This allows an increased voltage potential to be between the insulated driver electrode 432 and the ring collector electrode 422. Other examples of electrically conductive ozone reducing catalysts include, but are not limited to, noble metals.

In accordance with another embodiment of the present invention, if the ozone reducing catalyst is not electrically conductive, then the ozone reducing catalyst can be included in, or used as, the insulation 436. Preferably the ozone reducing catalysts should have a dielectric strength of at least 1000 V/mil (one-hundredth of an inch) in this embodiment.

When charged particles travel from the emitter electrode 412 toward the collector electrode 422, the particles are either missing electrons or have extra electrons. In order to clean the air of particles, it is desirable that the particles stick to the collector electrode 422 (which can later be cleaned). Accordingly, it is desirable that the exposed surfaces of the collector electrode 422 are electrically conductive so that the collector electrode 422 can give up a charge (i.e., an electron) or accept a charge. This phenomenon thereby causes the particles to stick to the collector electrode 422. Accordingly, if an ozone reducing catalyst is electrically conductive, the collector electrode 422 can be coated with the catalyst. However, it is preferred to coat the driver electrode 432, or the internal walls of the system housing, with the ozone reducing catalyst instead of the collector electrode 422. This is because, as particles collect on the interior surface 460 and the outer surface 461 of the collector electrode 422, the interior surface 460 becomes covered with the particles and reduces the effectiveness of the ozone-reducing catalyst. The driver electrode 432, on the other hand, may not collect as many particles as the collector electrodes 422. Thus, the effectiveness of the catalyst which is used to coat the driver electrode 432 will not diminish the effectiveness of the driver electrodes 432.

In accordance with one embodiment of the present invention, the pin emitter 412 electrode is generally coaxially arranged with the ring collector electrode 422 and generally in-line with the driver electrode 432 as shown in FIGS. 3 and 4A-4D. The pin emitter electrode 412 is generally conical in one embodiment. Alternatively, the pin emitter electrode 412 has a generally triangular, yet flat, wedge shape. In another embodiment, the pin emitter electrode 412 is a wire with its insulation stripped off at its distal end. In still another embodiment, the pin emitter electrode 412 resembles the shape of a needle. The pin emitter electrode 412 alternatively has a pyramidal shape. These are just a few exemplary shapes for the pin emitter electrode and are not meant to be limiting. In accordance with one embodiment of the present invention, the distal tip of the pin emitter electrode 412 can be somewhat rounded, rather than sharp, to reduce the amount of ozone created by the pin emitter electrode 412. The pin emitter electrode 412 can be made from metal, such as tungsten, or other appropriate materials (e.g. carbon). Tungsten is sufficiently robust in order to withstand cleaning, has a high melting point to retard breakdown due to ionization, and has a rough exterior surface that seems to promote efficient ionization. However, the emitter electrode is made of any other appropriate material besides tungsten.

The ring collector electrode 422 is shown in the Figures as having a generally round circumference. However, the ring collector electrode 422 can have other shapes, such as oval, racetrack shaped, hexagonal, octagonal, square or rectangular. The collector electrode 422 can be manufactured in various manners, such as from metal tubing, or from sheet metal that is formed into the desired configuration. In accordance with one embodiment of the present invention, the exposed surfaces (including the interior surface 460 and the outer surface 461) of the collector electrode 422 are highly polished to minimize unwanted point-to-point radiation. A polished surface also promotes ease of electrode cleaning. Other shapes, methods of manufacture and materials are also contemplated within the spirit and scope of the present invention.

The underlying conductive portion 434 of the driver electrode 432 is likely a wire or rod like electrode, but is not limited to those shapes. In accordance with one embodiment of the invention, the insulated driver electrode 432 is simply a piece of insulated wire. In such one embodiment, the upstream end of the driver electrode wire (which faces the pin emitter electrode 412) is preferably insulated. Thus, if the insulated driver electrode 432 is made by cutting an insulated wire to an appropriate length, the exposed end of the wire that faces the pin emitter electrode 412 should be appropriately insulated. Various exemplary types of insulation, as well as ways of applying the insulation have been discussed above. However, other types of insulation and ways of applying the insulation are also within the spirit and scope of the present invention.

Figure 8:
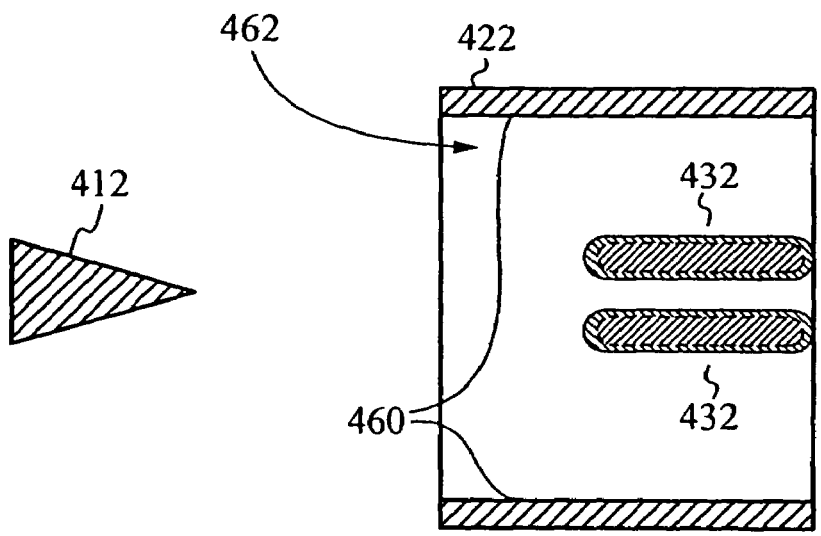
FIG. 8 illustrates an air-conditioner system according to another embodiment of the present invention.
Figure 9:
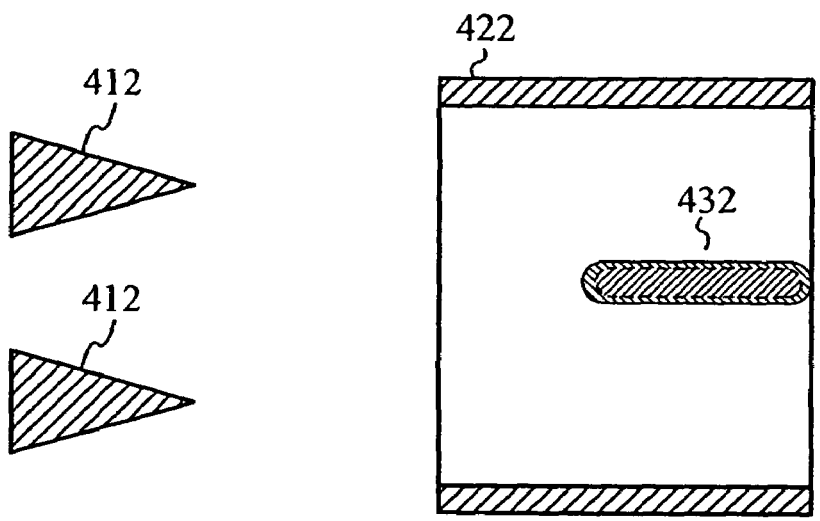
FIG. 9 illustrates an air conditioner system according to one embodiment of the present invention.
Figure 10:
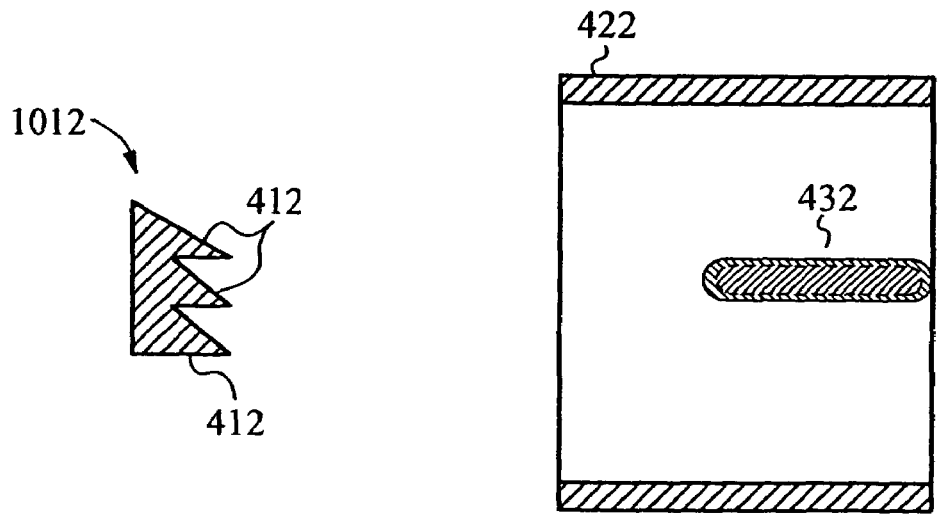
FIG. 10 illustrates an air conditioner system according to one embodiment of the present invention.
Figure 11A:
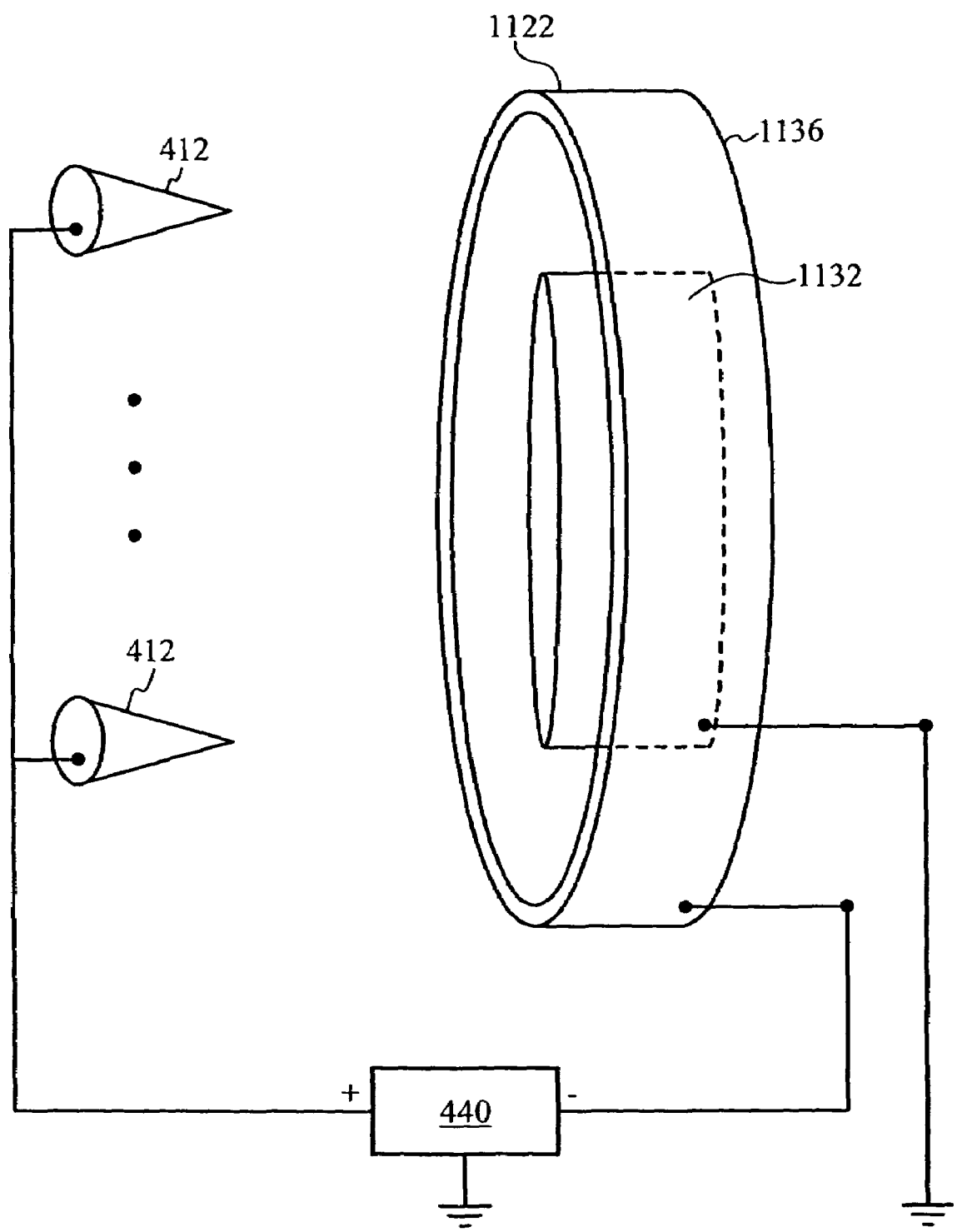
FIG. 11A illustrates an air conditioner system according to one embodiment of the present invention.
Figure 11B:
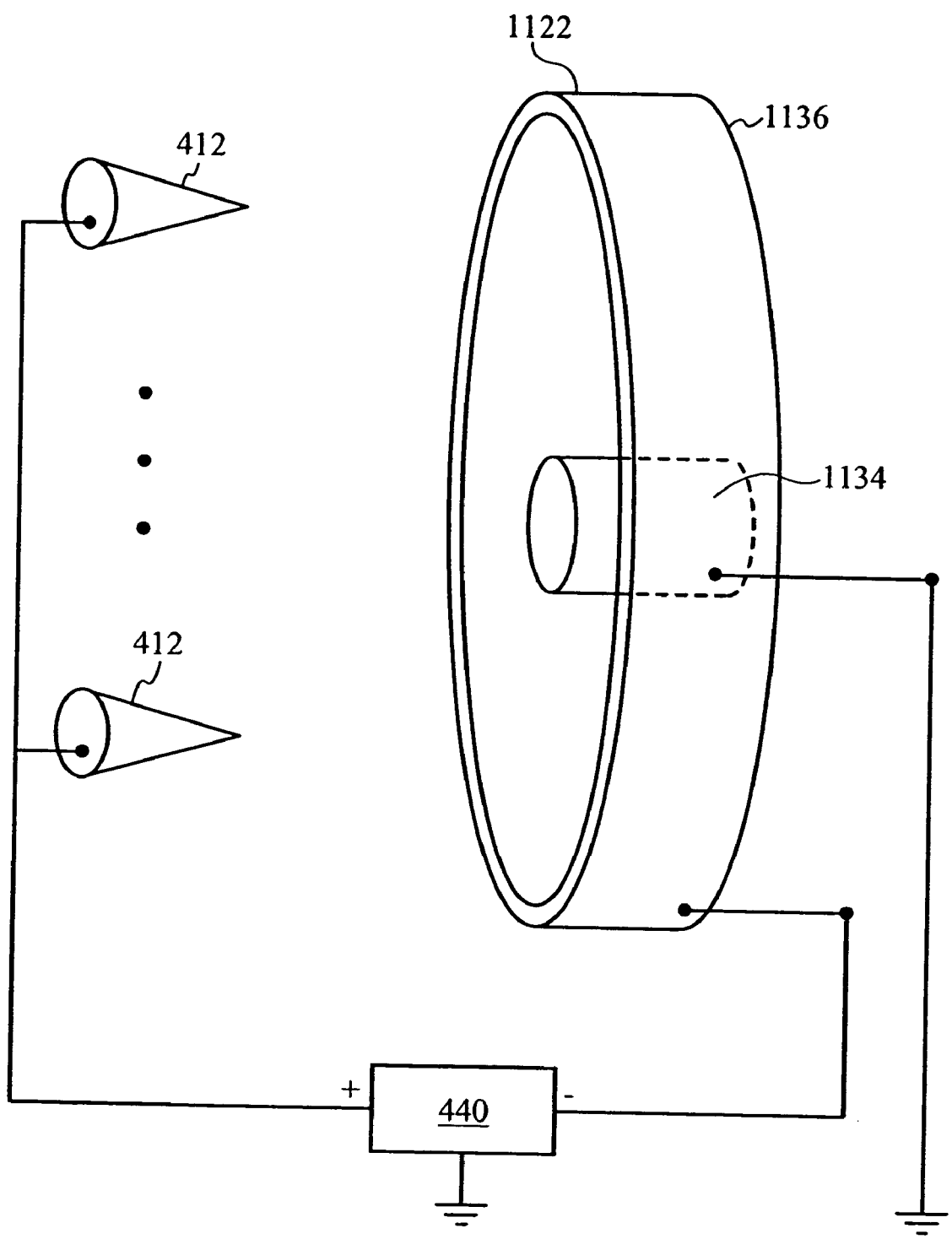
FIG. 11B illustrates an air conditioner system according to one embodiment of the present invention.

In the Figures discussed above, each emitter electrode 412 was shown as being associated with one collector electrode 422 and one driver electrode 432. However, there are other possible configurations that also within the scope of the present invention. For example, as shown in FIG. 8, more then one driver electrode 432 is located within the ring collector electrode 422. As shown in FIG. 9, more than one pin emitter electrode 412 is associated with a one ring collector electrode 422. Alternatively, a sawtooth like emitter electrode 1012 can provide the plurality of pin emitter electrodes 412, as shown in FIG. 10.

Where a column of two or more pin emitter electrodes 412 is used, in order to maintain a more uniform ionization region between the emitter electrodes 412 and the collector electrode 422, an oval, racetrack or otherwise elongated shaped ring collector electrode 1122 is utilized, as shown in FIG. 11A. Similarly, where an oval, racetrack or otherwise elongated shaped ring collector electrode 1122 is used, it is preferable to use a column of two or more pin emitter electrodes 412. As also shown in FIG. 11A, where an oval, racetrack or otherwise elongated shaped ring collector electrode 1122 is used, an elongated driver electrode 1132, which is preferably insulated, is used. In one embodiment, the driver electrode 1134 has a cylindrical rod shape (FIG. 11B), whereby the length of the driver electrode 1134 extends in a downstream direction towards the trailing end 1136 of the collector electrode 1122. Alternatively, a plurality of driver electrodes, having or not having cylindrical shapes, are configured to mirror the plurality of pin emitter electrodes 412.

Figure 12A:
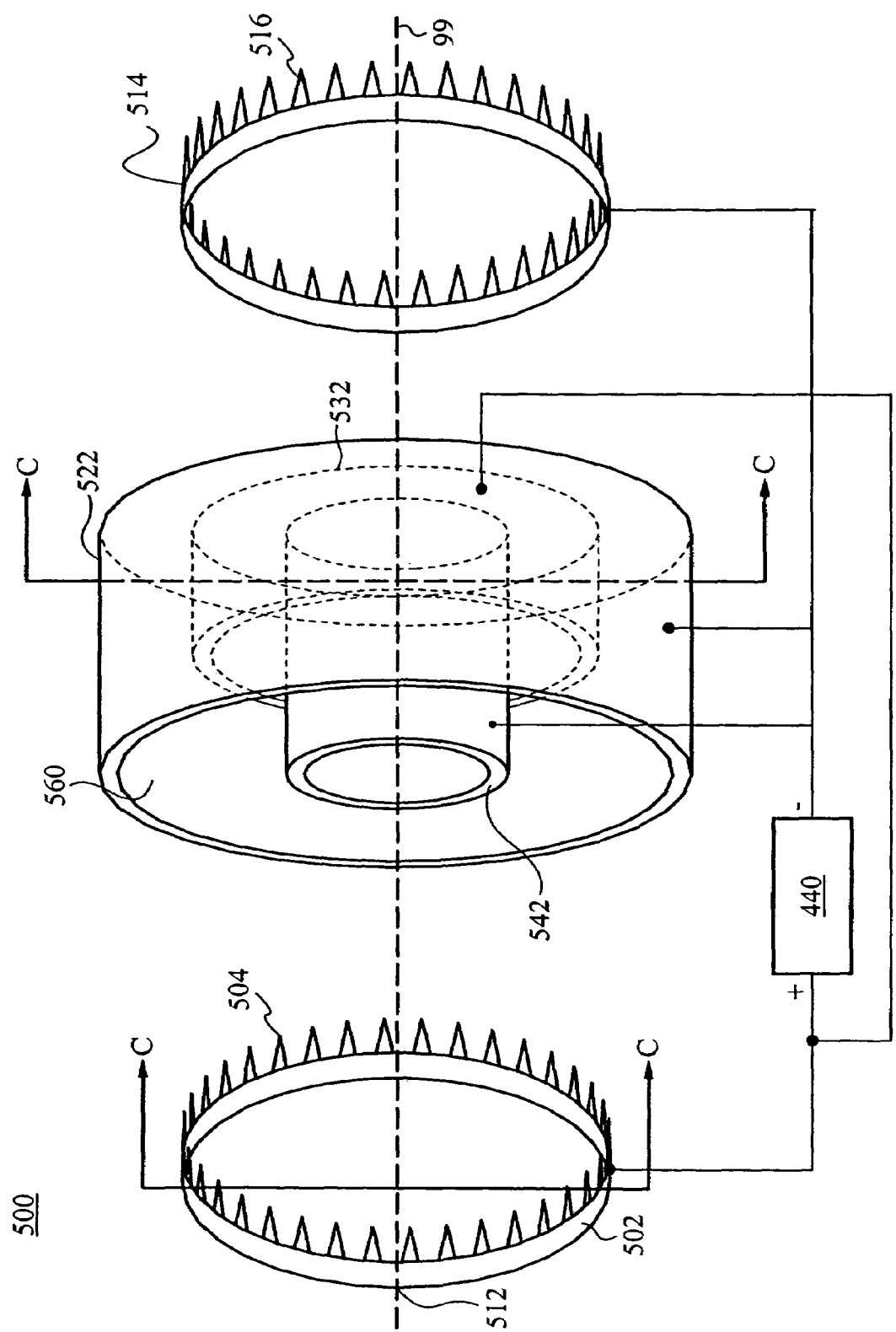
FIG. 12A illustrates an electrode assembly having a ring emitter electrode configuration according to one embodiment of the present invention.

FIG. 12A illustrates the electrode assembly 500 having a ring-shaped emitter electrode according to one embodiment of the present invention. As shown in FIG. 12A, the system 500 includes the ring-shaped emitter electrode 512, an outer cylindrical collector electrode 522, and the driver electrode 532 which is positioned within the collector electrode 522. In one embodiment, the driver electrode 532 is circular in shape, and the system also includes another circular collector electrode 542 positioned within the circular driver electrode 532, as shown in FIG. 12A. Alternatively, the inner collector electrode 542 is not utilized in the electrode assembly 500. It should be noted that the driver and/or collector electrode 522,532 alternatively has a non-circular design. In one embodiment, the electrode assembly 500 includes a trailing electrode 514 positioned downstream of the collector electrode 532, as shown in FIG. 12A. In one embodiment, the trailing electrode 514 has a plurality of ion emitting pins 516 arranged axially about the center axis 99 and positioned downstream of the collector electrode 522. In the embodiment shown in FIG. 12A, the trailing electrode 514 is shaped similarly to the emitter electrode 512; however, the trailing electrode is alternatively a wire or has a pointed triangular-shape. As shown in FIG. 12A, the trailing electrode 514 is shown electrically connected to the negative terminal of the voltage source 440. It is contemplated, however, that the trailing electrode 514 is alternatively connected to a separate high voltage source which controls the trailing electrode 514 independently of the collector, driver and emitter electrodes. More details regarding the trailing electrode are discussed in the U.S. Pat. No. 60/590,735 application which is incorporated by reference above.

The pins 504 of the ring emitter electrode 512 are electrically connected to the cylindrical body 502, whereby the pins 504 emit ions when energized by the voltage source 440. The emitter electrode 512 is shown electrically connected to the positive terminal of the voltage source 440, although the emitter electrode 512 is alternatively grounded. The driver electrode 532 is electrically connected to the positive terminal of the voltage source 440 in one embodiment. In another embodiment, the driver electrode 532 is grounded. The collector electrodes 522, 542 are electrically connected to the negative terminal of the voltage source 440 in one embodiment. In another embodiment, the collector electrodes 522, 542 are grounded.

As shown in FIG. 12A, the emitter electrode 512 preferably has a cylindrical body 502 with several pins 504 facing downstream and are arranged around the perimeter of the body 502. In one embodiment, the pins 504 are directly attached to an inside surface of the device housing and are mounted on a body. It is preferred that the cylindrical body 502 is circular in shape such that the pins 504 are arranged radially around the perimeter of the circular body 502 and axially about the center axis 99. Alternatively, the cylindrical body 502 is non-circular and has another shape (e.g. hexagonal, decagonal, oval, FIG. 8), whereby the pins 504 are arranged axially about the center 99. Considering that the pins 504 are arranged about the outer perimeter of the non-circular body 502, the pins 504 are still arranged axially about the center 99 and have an overall shape consistent with the shape of the body 502. For example only, an octagonal shaped body 502 having pins 504 arranged along the body's octagonal perimeter would have the pins 504 arranged axially about the center 99 and in an octagonal shape.

Air flowing through the electrode assembly 500 is preferably able to flow through the open area within the ring emitter electrode 512 and within the area between oppositely spaced pins 504. In addition, air is able to flow outside the area within opposite spaced pins 504. The axial arrangement of the pins 504 creates a more uniform ionization region and generally will driver more air to flow into the energy field of the ionization region.

The pins 504 are generally conical in one embodiment, wherein the pins 504 base, which is attached to the body 502, that tapers toward an apex. Alternatively, the pins 504 each have a generally triangular, yet flat, wedge shape. In another embodiment, the pins 504 each have a wire with its insulation stripped off at the end facing downstream. In still another embodiment, the pins 504 each resemble the shape of a needle. The pins 504 each alternatively have a pyramidal shape. In accordance with one embodiment of the present invention, the distal tip of the pins 504 can be somewhat rounded, rather than sharp. These are just a few exemplary shapes for the pins 504 and are not meant to be limiting. It should be noted that the emitter electrode 512 alternatively having a combination of differently shaped pins 504.

The pin emitter electrode 512 can be made from metal, such as tungsten. Tungsten is sufficiently robust in order to withstand cleaning, has a high melting point to retard breakdown due to ionization, and has a rough exterior surface that seems to promote efficient ionization. However, the emitter electrode is made of any other appropriate material other than tungsten (e.g. carbon).

In one embodiment, the emitter electrode 512 is positioned such that the pins 504 are arranged coaxially with the collector electrode 522. Thus, as shown in FIG. 12A, the emitter electrode 512 as well as the collector electrode 522 are centered along axis 99. In one embodiment, the driver electrode 532 is also coaxial with the emitter and collector electrodes 512, 522, whereby the driver electrode 532 is also centered about the axis 99. In another embodiment, the collector electrode 542 is also coaxial with the other electrodes 512, 522, 532 about the axis 99. In other embodiments, at least one of the emitter electrode 512, collector electrodes 522, 542 and driver electrode 532 is positioned non-coincident with the other electrodes in the electrode assembly 500.

As shown in FIG. 12A, it is preferred that the opening of the ring emitter electrode 512 is smaller in dimension than the opening of the collector electrode 522. For example only, in the embodiment having the circular emitter electrode 512 and the circular collector electrode 522, the diameter of the emitter electrode 512 would be smaller in dimension than the diameter of the collector electrode 522. In another embodiment, the opening of the ring emitter electrode 512 is larger in dimension than the opening of the collector electrode 522. In yet another embodiment, the distance between opening of the ring emitter electrode 512 is equivalent in dimension to the opening of the collector electrode 522. Alternatively, the opening of the ring emitter electrode 512 is equivalent in dimension to the opening of the driver electrode 532.

Figure 12B:
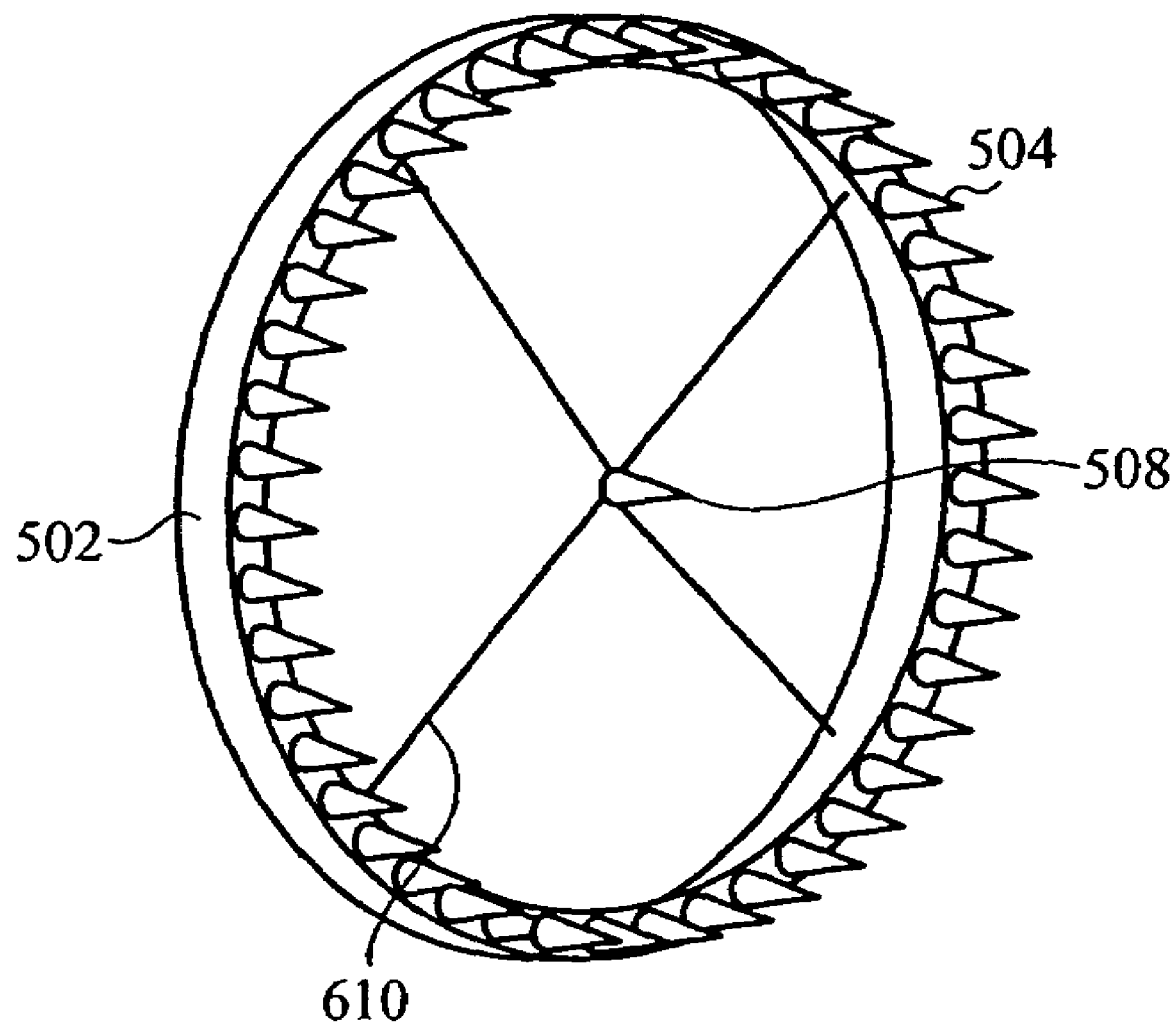
FIG. 12B illustrates a perspective view of one embodiment of the ring emitter electrode configuration in accordance with the present invention.
Figure 12C:
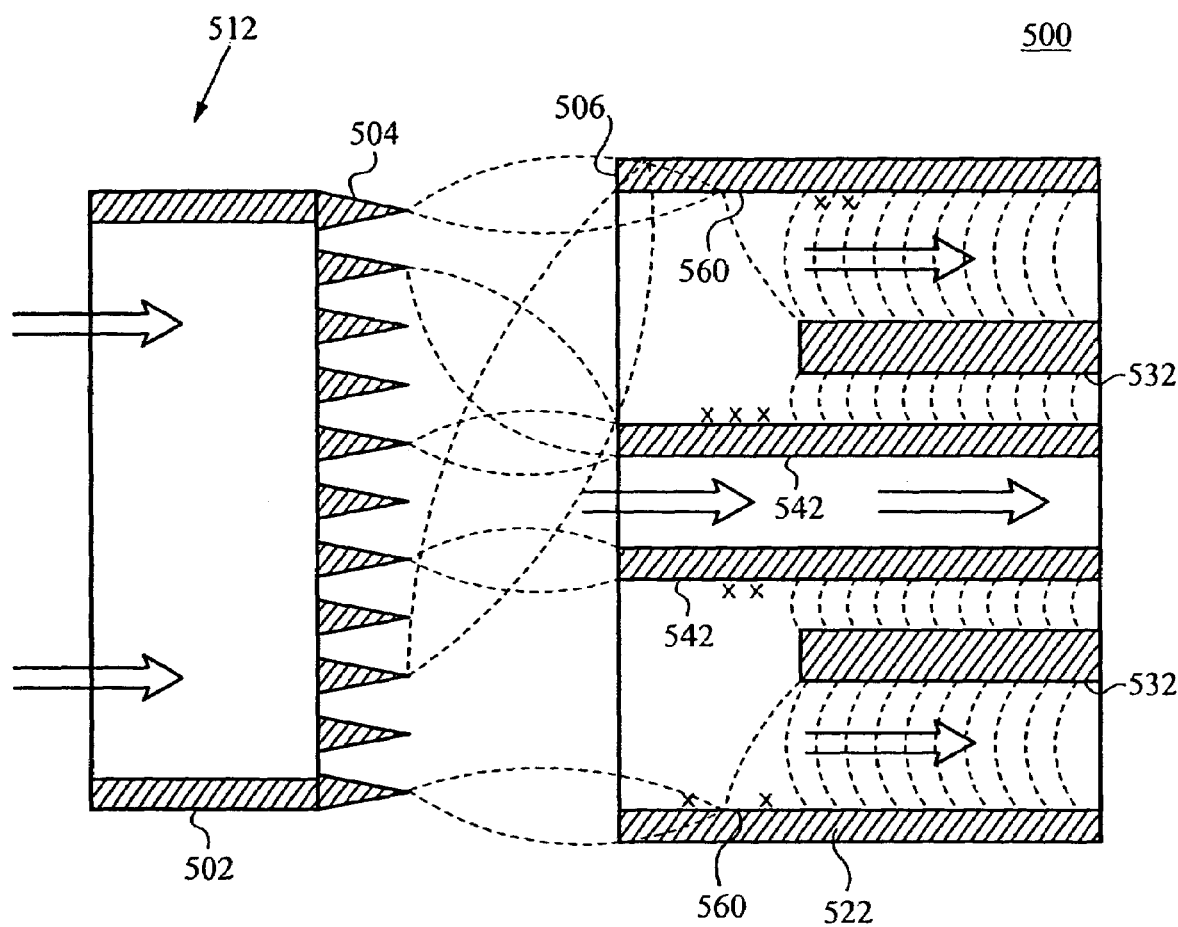
FIG. 12C illustrates a simplified cross-sectional side view of a portion of the electrode assembly in FIG. 12A along line C-C according to one embodiment of the present invention;.

Although one ring of pins 504 is shown axially arranged about the axis 99 in FIG. 12C, the emitter electrode 512 alternatively includes a plurality of concentric emitter electrode rings 512 disposed about the axis 99. In another embodiment, shown in FIG. 12B, the emitter electrode 612 includes one or more pins 508 positioned at or near the center of the body 502. In one embodiment, the pin 508 is positioned in the center along the axis 99 of the emitter electrode 612 by a set of wires 610. Although four wires 610 are shown in FIG. 12B, any number of wires are alternatively contemplated. In another embodiment, the pin 508 is positioned within the body 502 by any other mechanism or means. The wires 610 are conductive and are connected to the body 502 (FIG. 12B) and/or the axially arranged pins 504 in one embodiment. In another embodiment, the wires 610 are electrically connected directly to the voltage source 440 (FIG. 12A). The wires 610, when energized by the voltage source 440 (FIG. 12A) are also able to emit ions in the airflow stream through emitter electrode 612 and further generate the ionization region discussed above. In another embodiment, the wires 610 are insulated and do not emit ions in the airflow.

FIG. 12C depicts force field lines present between the ring emitter electrode 512 and the collector and driver electrodes 522, 532. It should be noted that some, and not all, of the force field lines are shown in FIG. 12B for clarity purposes. Upon the system being energized, the pins 504 emit ions to produce the ionization region which causes air to move in a downstream direction from the emitter electrode 512 to the collector electrode 522. In addition, the several pins 504 increase the strength of the ionization region, since each pin 504 is preferably substantially equidistant from the front edge 506 of the collector electrode 522. In addition, the increased number of pins 504 are arranged to allow the emitter electrode 512 to fit within a compact space of a housing while producing a more concentrated ionization region. The axial arrangement of the several pins 504 thus generate a substantially uniform and concentrated ionization region between the emitter and collector electrodes 512, 522. This configuration increases the amount of ions produced in the air as well as the rate of airflow generated by the electrode assembly. Further, the ring emitter electrode 512 increases the particle ionizing efficiency due to the increased number and spacing of the pins 504.

As shown in FIGS. 12A and 12C, the electrode assembly 500 also includes a driver electrode 532, which increases the particle collection efficiency of the collector electrode 522. In addition, the driver electrode 532 reduces the percentage of particles that escape through the collector electrode 522 by pushing particles in air flow toward the inside surface 560 of the collector electrode 422. As mentioned above, the driver electrode 532 is preferably insulated. Also, as stated above, the leading end (i.e., upstream end) of the driver electrode 532 is preferably set back (i.e., downstream) from the leading end of the collector electrode 522 by a distance that is about the same as the diameter of the ring collector electrode 522. This is so the driver electrode 432 and the collector electrode 422 (i.e. the collecting region) does not interfere with the ionization region between the emitter electrode 412 and the collector electrode 422.

Further, in one embodiment, as shown in FIGS. 12A and 12C, the electrode assembly 500 includes the inner collector electrode 542 positioned within the cylindrical driver electrode 532. As with the outer collector electrode 522, the position of the driver electrode 532 outside of the inner collector electrode 542 increases the particle collection efficiency of the entire electrode assembly 500. This is due to the repelling effects caused by the electrical arrangement of the driver electrode 532 in relation to the collector electrodes 522, 542. Thus, air entering the collecting region will flow through the area between the driver electrode 532 and the outer collector electrode 522 as well as the area between the driver electrode 532 and the inner collector electrode 542, whereby the driver electrode 532 pushes ionized particles toward the outer and inner collector electrodes 522,542. This arrangement results in a significant increase in the particle collection efficiency of the electrode assembly 500.

The inner collector electrode 542 is concentric with the outer collector electrode 522 about the axis 99. In FIGS. 12A and 12C, one inner collector electrode 542 is shown disposed within the outer collector electrode 522. However, it is contemplated that any number of collector electrodes are concentrically arranged within the outer collector electrode 522. The inner collector electrode 542 is designed to have the same length as the outer collector electrode 522, as shown in FIG. 12C. In another embodiment, the inner collector electrode 542 is a length dimension less than the length dimension of the outer collector electrode 522. The length dimension is defined herein as the distance between the upstream edge and the downstream edge of the cylindrical electrode.

Figure 13A:
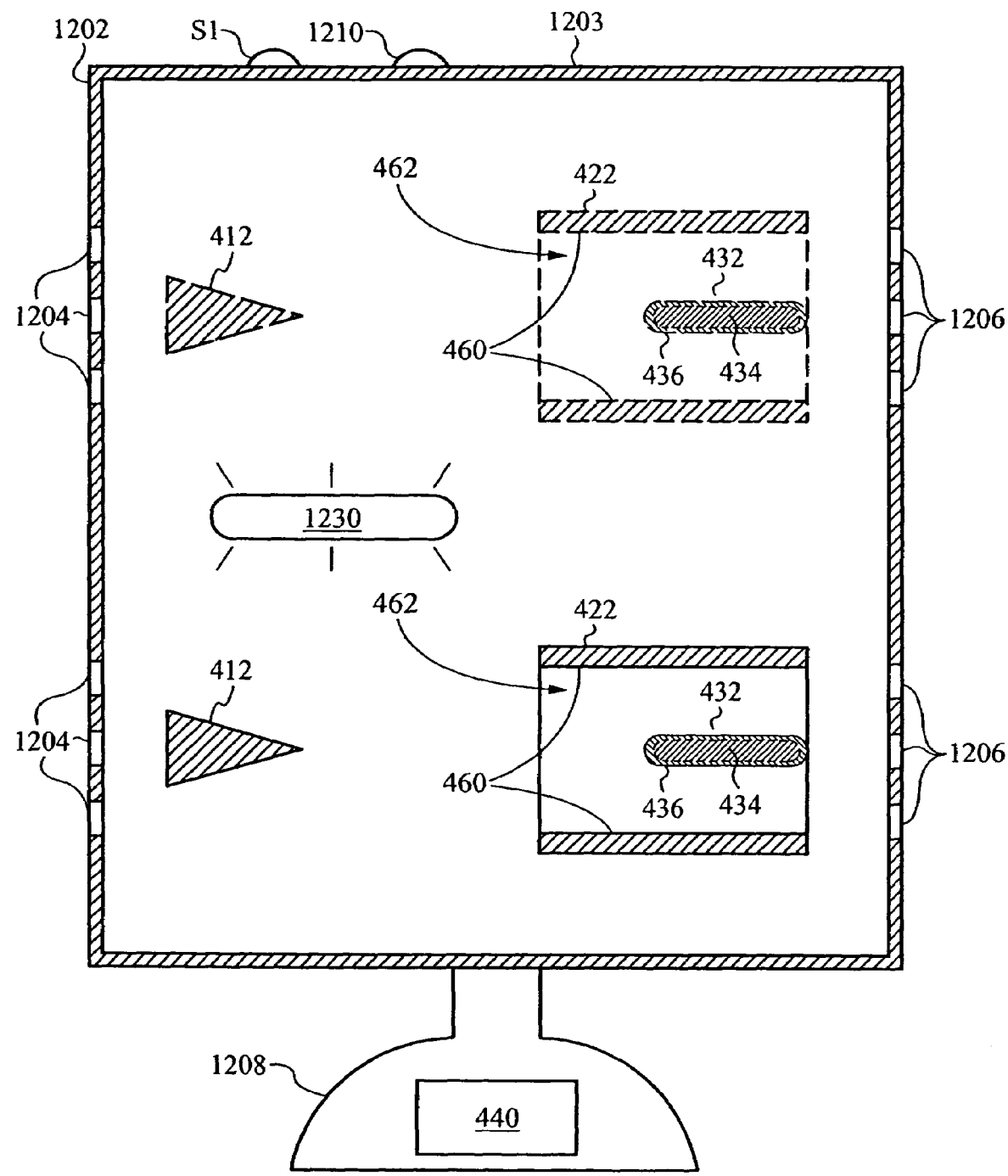
FIGS. 13A-13C illustrate cross sections of housings including air conditioner systems, according to embodiments of the present invention.

Referring now to FIG. 13A, the above described air conditioner systems are likely within or include a free-standing housing 1202. The housing likely includes one or more intake vents 1204, one or more outlet vents 1206, and a base pedestal 1208. The housing 1202 can be upstandingly vertical and/or elongated. The base 1208 in FIG. 13A, which maybe pivotally mounted to the remainder of the housing 1202, allows the housing 1202 to remain in a vertical position.

Internal to the housing 1202 is one of the air-conditioner systems described above. The air conditioner system is likely powered by an AC:DC power supply that is energizable or excitable using switch S1. Switch S1, along with the other user operated switches such as a control dial 1210, are preferably located on or near a top 1203 of the housing 1202. The whole system is self-contained in that other than ambient air, nothing is required from beyond the housing 1202, except perhaps an external operating potential, for operation of the present invention.

There need be no real distinction between vents 1204 and 1206, except their location relative to the electrodes. These vents serve to ensure that an adequate flow of ambient air can be drawn into or made available to the electrodes, and that an adequate flow of ionized cleaned air moves out from housing 1202. The input and/or output vents 1204 and 1206 can be located in a grate, panel, or the like, which can be removed from the housing 1202, to thereby provide access to the electrodes for cleaning. It is also possible that some or all of the electrodes can be removed from the housing 1202 to allow for cleaning of the electrode(s) to occur outside the housing 1202.

The above described embodiments do not specifically include a germicidal (e.g., ultra-violet) lamp. However, it is contemplated that the germicidal lamp 1230 is located upstream from, downstream from and/or adjacent the electrodes, to destroy germs within the airflow. It is even possible that the lamp be located partially or fully within the interior of a ring electrode 422, depending on the size of the ring electrode 422 and lamp 1230. Although germicidal lamps are not shown in many of the above-described Figures, it should be understood that the germicidal lamp 1230 can be used in all embodiments of the present invention. Where the insulated driver electrode 432 is coated with an ozone-reducing catalyst, the ultra-violet radiation from the lamp 1230 may increase the effectiveness of the catalyst. The airflow from the emitter electrode 412 toward the collector electrode 422 is preferably electro-kinetically produced, in that there are no intentionally moving parts within unit. (Some mechanical vibration may occur within the electrodes). Additionally, because particles are collected on the collector electrodes 422, the air in the room is cleared. Additional details of the inclusion of a germicidal lamp are included in U.S. Pat. No. 6,444,484, entitled "Electro-Kinetic Device with Enhanced Anti-Microorganism Capability," and U.S. Pat. No. 6,911,186, entitled "Electro-Kinetic Air Transporter and Conditioner Device with Enhanced Housing Configuration and Enhanced Anti-Microorganism Capability," each of which is incorporated herein by reference.

Figure 13B:
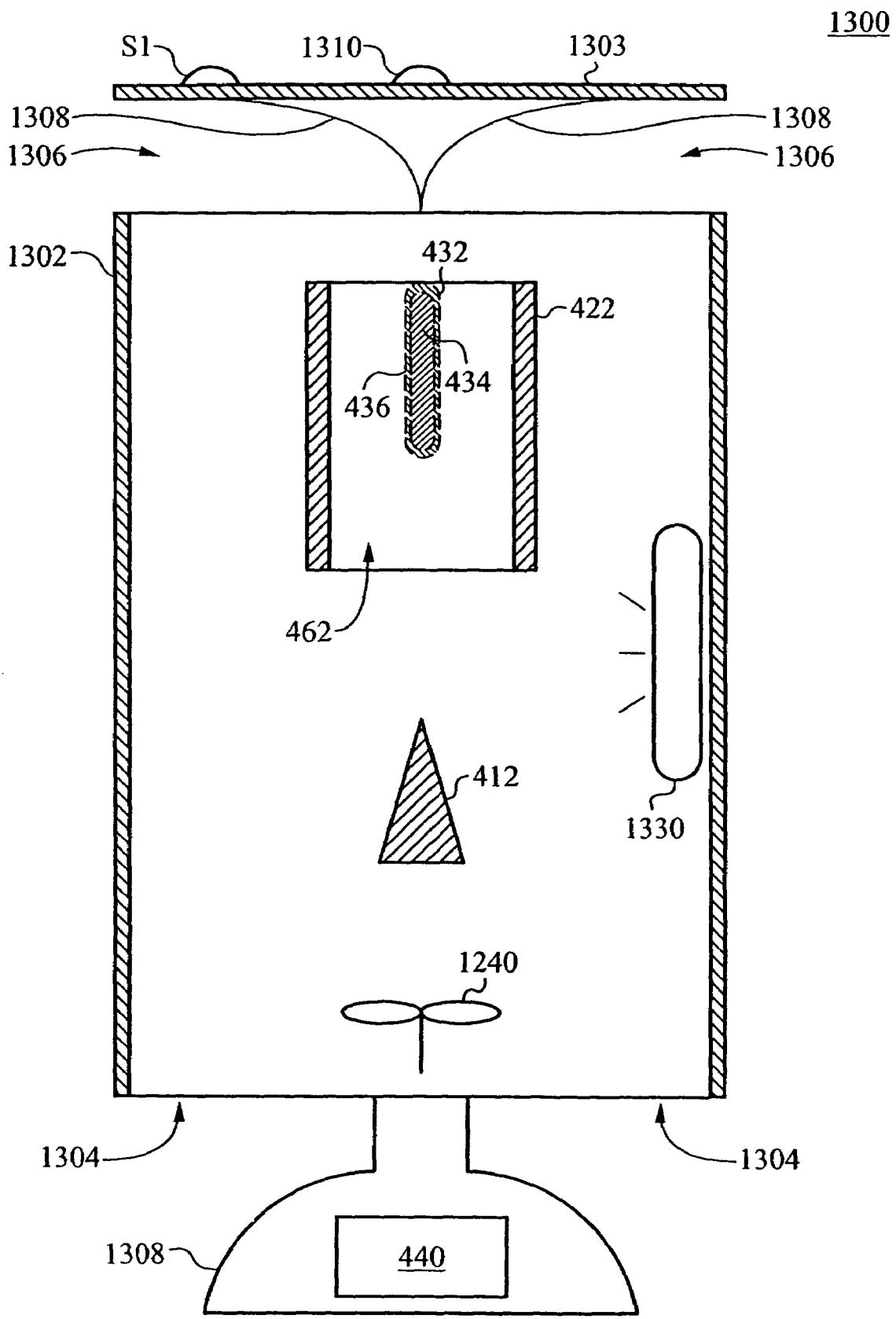

FIG. 13B illustrates a schematic of another embodiment of the device 1300 in accordance with the present invention. As shown in FIG. 13B, the inlet 1304 is located near the bottom of the housing 1302, and the outlet 1306 is located near the top of the housing 1302. The electrodes 412,422 and 432 are arranged within the housing 1302 to produce a vertical airflow from the inlet 1304 to the outlet 1306. The germicidal lamp 1330 is positioned to the side of the electrodes 412, 422, 432 as shown in FIG. 13B. However, the lamp 1330 is alternatively positioned elsewhere within the housing 1302 as stated above. Baffles 1308 near the top of the housing 1302 redirect the outgoing airflow in a generally horizontal direction. Depending on the electrode assembly shape and arrangement, the housing 1302 may be more elongated in the horizontal direction or in the vertical direction. It would also be possible, if desired, to increase airflow through the device 1302 by adding a fan 1240, as shown in FIG. 13B. Even with a fan 1240, the driver electrode 432 increases particle collecting efficiency.

Figure 13C:
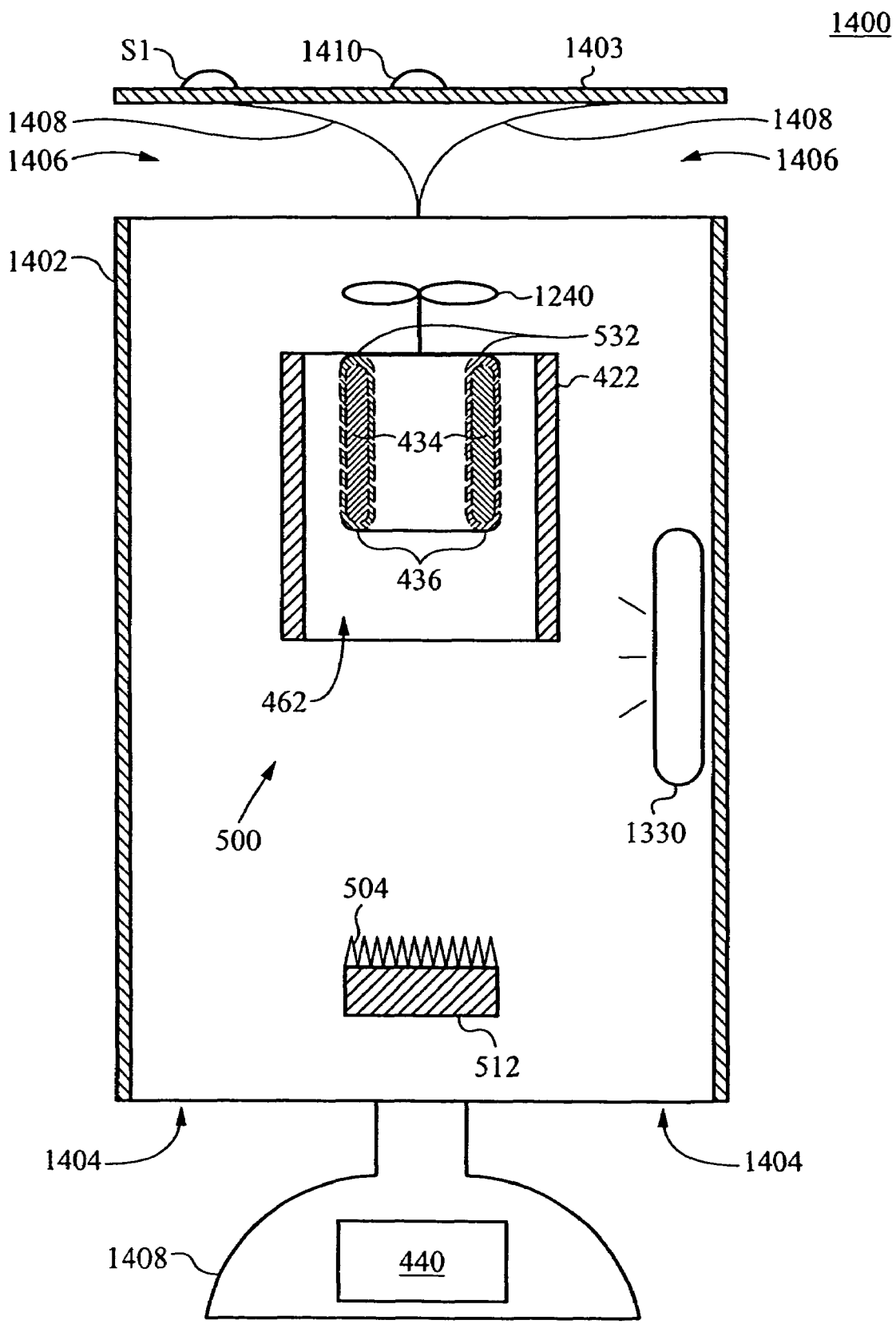

FIG. 13C illustrates a schematic of another embodiment of the device 1400 in accordance with the present invention. As shown in FIG. 13C, the inlet 1404 is located near the bottom of the housing 1402, and the outlet 1406 is located near the top of the housing 1402. The electrodes 422, 512 and 532 are arranged within the housing 1402 to produce a vertical airflow from the inlet 1404 to the outlet 1406. As with previous embodiments shown in FIGS. 12A, 12B and 12C, the pins 504 of the emitter electrode are preferably arranged in a circular shape. However, the pins 504 of the emitter electrode are alternatively arranged in any other shape. The germicidal lamp 1430 is positioned to the side of the electrodes 422, 512, 532 as shown in FIG. 13C. Baffles 1408 near the top of the housing 1402 redirect the outgoing airflow in a generally horizontal direction.

As shown in FIG. 13C, the ring-shaped emitter electrode 512 has the pins 504 in axial arrangement, as discussed above. In addition, the cylindrical collector electrode 422 has the cylindrical driver electrode 532 positioned within. In one embodiment, the second collector electrode 542 is positioned within the driver electrode 532, although not necessarily. It is preferred that the housing 1402 includes the fan 1240 positioned downstream of the collector and driver electrodes 422, 532.

In the embodiment shown in FIG. 13C, air enters the housing 1402 through the inlet 1404, wherein a portion of the air is drawn into the housing by the electrode assembly 500 and a portion is drawn by the fan 1240. The air is ionized by the ring emitter electrode 512, whereby the ionization field between the emitter electrode 512 and the collector electrode 422 is strong due to the axially arranged pins 504. As stated above, the strong ionization field causes a higher amount of particles in the airflow to be ionized. The ionized air flows downstream toward the collector electrode 422, whereby the air is exposed to the germicidal lamp 1330. Alternatively, the housing 1402 does not include a germicidal lamp 1330 therein. The increased number of ionized particles in the air increases the particle collection efficiency of the collector electrodes 422 due to the stronger ionization field and the presence of the driver electrodes 532. The stronger ionization field will also increase the airflow rate through the housing 1402. In addition, the fan 1240 will increase the rate of airflow, whereby the air is output through the outlet 1406.

The foregoing descriptions of the preferred embodiments of the present invention have been provided for the purposes of illustration and description. It is not intended to be exhaustive or to limit the invention to the precise forms disclosed. Many modifications and variations will be apparent to the practitioner skilled in the art. Modifications and variations maybe made to the disclosed embodiments without departing from the subject and spirit of the invention as defined by the following claims. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed:

1. An air conditioner system comprising:
   a. an emitter electrode having a plurality of pins arranged axially in a circular configuration about a center axis of the emitter electrode;
   b. a collector electrode located downstream from the emitter electrode;
   c. a driver electrode located at least partially within the collector electrode; and
   d. a high voltage source adapted to provide a voltage differential to at least one of the emitter electrode and the collector electrode to at least create ions in a flow of air downstream from the emitter electrode to the collector electrode.

2. The system of claim 1 wherein the pins are arranged radially about the center axis.

3. The system of claim 1 further comprising a fan positioned upstream of the emitter electrode.

4. The system of claim 1 wherein the emitter electrode has an emitter diameter and the collector electrode has a collector diameter, wherein the emitter diameter is larger than the collector diameter.

5. The system of claim 1 wherein the emitter electrode has an emitter diameter and the collector electrode has a collector diameter, wherein the collector diameter is larger than the emitter diameter.

6. The system of claim 1 wherein at least one of the pins has a tapered configuration in a downstream direction toward the collector electrode.

7. The system of claim 1 wherein each pin is a wire having a tip facing downstream.

8. The system of claim 1 wherein the collector electrode is cylindrical shaped.

9. The system of claim 8 wherein the cylindrical collector electrode is positioned coaxially with the center axis.

10. The system of claim 1 wherein the driver electrode is cylindrical shaped.

11. The system of claim 10 further comprising a second collector electrode located downstream from the emitter electrode and positioned within the driver electrode.

12. The system of claim 10 wherein the driver electrode is coaxial with the center axis.

13. The system of claim 1 wherein the emitter electrode includes an additional pin positioned at the center axis.

14. An air conditioner system comprising:
    a. an emitter electrode having a plurality of substantially pointed members in a circular arrangement about a center axis of the emitter electrode;
    b. a first collector electrode located downstream from the emitter electrode;
    c. a second collector electrode positioned at least partially within the first collector electrode;
    d. a driver electrode positioned interstitially between the first and second collector electrodes;
    e. a high voltage source adapted to provide a voltage differential to at least one of the emitter electrode and the first collector electrode to at least create ions in a flow of air downstream from the emitter electrode to the first collector electrode.

15. The system of claim 14 wherein at least one pointed member in the plurality further comprises a conical shape.

16. The system of claim 14 further comprising a fan positioned downstream of the first and second collector electrodes.

17. The system of claim 14 further comprising a fan positioned upstream of the emitter electrode.

18. The system of claim 14 wherein the driver electrode includes an upstream end and a downstream end, the downstream end of the driver electrode positioned proximal to a downstream end of the collector electrodes.

19. The system of claim 14 wherein the driver electrode is insulated.

20. The system of claim 14 wherein the first collector electrode is cylindrical shaped.

21. The system of claim 20 wherein at least one of the cylindrical collector electrodes is coaxial with the emitter electrode.

22. The system of claim 14 wherein the driver electrode is cylindrical shaped.

23. The system of claim 22 wherein the driver electrode is coaxial with the emitter electrode.

24. The system of claim 14 wherein the emitter electrode includes an additional pointed member positioned at the center.

25. An air conditioner system comprising:
   a. a plurality of pointed emitter electrodes arranged in a circle about an axis;
   b. a first cylindrical collector electrode downstream from the emitter electrodes and coaxial with the axis;
   c. a cylindrical driver electrode located at least partially within an interior of the collector electrode and concentric with the axis;
   d. a high voltage source adapted to provide a voltage differential to at least one of the emitter electrodes and the collector electrode to at least create ions in a flow of air downstream from the emitter electrodes to the collector electrode; and
   e. a fan downstream from the collector electrode, wherein the fan at least partially creates the flow of air from the emitter electrodes to the collector electrode.

26. The system of claim 25 wherein the emitter electrodes are arranged radially about the axis.

27. The system of claim 25 further comprising a germicidal lamp.

28. The system of claim 25 further comprising a second cylindrical collector electrode concentrically positioned about the axis, wherein the cylindrical driver is interstitially positioned between the first and second cylindrical collector electrodes.

29. The system of claim 25 further comprising an additional emitter electrode positioned along the axis.

30. The system of claim 25 wherein the driver electrode is insulated.

31. An air conditioner system comprising:
   a. a freestanding housing including at least one inlet vent and one outlet vent; and
   b. an electrode assembly located within the housing further comprising:
      i. an emitter electrode having a plurality of pins arranged axially in a circular configuration about a center axis of the emitter electrode;
      ii. a collector electrode downstream from the emitter electrode;
      iii. a driver electrode located at least partially within the collector electrode; and
      iv. a high voltage source adapted to provide a voltage differential to at least one of the emitter electrode and the collector electrode to at least create ions in a flow of air downstream from the emitter electrode to the collector electrode.

32. The system of claim 31 wherein the pins are arranged radially about the center axis.

33. The system of claim 31 further comprising an additional pin positioned along the center axis.

34. The system of claim 31 further comprising a second collector electrode positioned within the driver electrode.

35. The system of claim 31 further comprising a fan upstream from the emitter electrode, wherein the fan produces the flow of air from the inlet vent to the outlet vent.

36. The system of claim 31 further comprising a fan downstream from the collector electrode, wherein the fan produces the flow of air from the inlet vent to the outlet vent.

37. The system of claim 31 further comprising a germicidal lamp within the housing, wherein the germicidal lamp irradiates at least a portion of a flow of air from the inlet vent to the outlet vent.

38. The system of claim 31 wherein the collector electrode is cylindrical shaped.

39. The system of claim 38 wherein the cylindrical collector electrode is coaxial with the emitter electrode.

40. The system of claim 31 wherein the driver electrode is cylindrical shaped.

41. The system of claim 40 wherein the driver electrode is coaxial with the emitter electrode.

* * * * *